US011863729B2

(12) United States Patent
Wu et al.

(10) Patent No.: US 11,863,729 B2
(45) Date of Patent: Jan. 2, 2024

(54) SYSTEMS AND METHODS FOR GENERATING SYNTHETIC DEPTH OF FIELD EFFECTS

(71) Applicant: QUALCOMM Incorporated, San Diego, CA (US)

(72) Inventors: Meng-Lin Wu, San Diego, CA (US); Venkata Ravi Kiran Dayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/481,155

(22) Filed: Sep. 21, 2021

(65) Prior Publication Data
US 2023/0091313 A1 Mar. 23, 2023

(51) Int. Cl.
*H04N 13/111* (2018.01)
*G06T 7/593* (2017.01)
(Continued)

(52) U.S. Cl.
CPC .............. *H04N 13/111* (2018.05); *G06T 3/40* (2013.01); *G06T 7/593* (2017.01); *G06V 20/00* (2022.01);
(Continued)

(58) Field of Classification Search
CPC .............. G06T 1/20; G06T 2207/10016; G06T 2207/10052; G06T 7/557; G06T 2207/10024; G06T 2207/10141; G06T 2207/20221; G06T 5/001; G06T 5/003; G06T 5/50; G06T 7/33
See application file for complete search history.

(56) References Cited

U.S. PATENT DOCUMENTS 9,900,584 B2 2/2018 Nisenzon
10,382,712 B1 * 8/2019 Forutanpour .......... H04N 23/80
(Continued)

FOREIGN PATENT DOCUMENTS

CN 109565534 A * 4/2019 ............. G03B 41/00
CN 109565537 A * 4/2019 ............. G03B 17/02
CN 112614057 A * 4/2021

OTHER PUBLICATIONS

International Search Report and Written Opinion—PCT/US2022/076436—ISA/EPO—dated Feb. 1, 2023.
(Continued)

*Primary Examiner* — Ming Wu
(74) *Attorney, Agent, or Firm* — QUALCOMM Incorporated

(57) ABSTRACT

Systems and techniques are described for processing image data to generate an image with a synthetic depth of field (DoF). An imaging system receives first image data of a scene captured by a first image sensor. The imaging system receives second image data of the scene captured by a second image sensor. The first image sensor is offset from the second image sensor by an offset distance. The imaging system generates, using at least the first image data and the second image data as inputs to one or more trained machine learning systems, an image having a synthetic depth of field corresponding to a simulated aperture size. The simulated aperture size is associated with the offset distance. The imaging system outputs the image.

26 Claims, 22 Drawing Sheets

(51) Int. Cl.
*H04N 13/128* (2018.01)
*H04N 13/156* (2018.01)
*H04N 13/243* (2018.01)
*G06V 20/00* (2022.01)
G06T 3/40 (2006.01)
*H04N 13/00* (2018.01)

(52) U.S. Cl.
CPC ......... *H04N 13/128* (2018.05); *H04N 13/156* (2018.05); *H04N 13/243* (2018.05); *G06T 2207/10012* (2013.01); *G06T 2207/20081* (2013.01); *H04N 2013/0081* (2013.01)

(56) References Cited

U.S. PATENT DOCUMENTS

| | | | |
|---|---|---|---|
| 10,823,843 B1* | 11/2020 | Kendra | G01S 13/9023 |
| 2017/0358137 A1* | 12/2017 | Auten | A63F 13/00 |
| 2018/0035036 A1* | 2/2018 | Ahn | H04N 23/45 |

OTHER PUBLICATIONS

Luo C., et al., "Wavelet Synthesis Net for Disparity Estimation to Synthesize DSLR Calibre Bokeh Effect on Smart phones", IEEE/CVF Conference on Computer Vision and Pattern Recognition (CVPR), Jun. 13, 2020, pp. 2404-2412, XP033803497, DOI: 10.1109/CVPR42600.2020.00248, Abstract, p. 2405-2406, Figure 2.

Wu M-L., et al., "Direct Handheld Burst Imaging to Simulated Defocus", Arxiv.Org, Cornell University Library, 201 Olin Library Cornell University Ithaca, Ny, 14853, Jul. 9, 2022, 5 Pages, XP091267706, The whole document.

\* cited by examiner

SYSTEMS AND METHODS FOR GENERATING SYNTHETIC DEPTH OF FIELD EFFECTS

FIELD

This application is related to image processing. More specifically, this application relates to systems and methods of using image data captured by multiple image sensors as inputs to one or more machine learning systems to generate an image with a synthetic depth of field (DoF).

BACKGROUND

The depth of field (DoF) of a camera refers to a range of distances from a camera that a subject of an image can be positioned in order to appear in-focus and sharp in the image, rather than out-of-focus and blurry. The DoF of a camera is generally a function of the aperture size of the camera and/or the focal length of the lens of the camera. For instance, cameras with larger apertures generally have shallower DoFs than cameras with smaller apertures. Similarly, cameras with longer focal lengths generally have shallower DoFs than cameras with shorter focal lengths. It is generally desirable for the subject of an image to be in-focus and therefore in the DoF of the camera, while other portions of the image are out-of-focus and therefore out of the DoF. A long DoF makes such images difficult to capture, since most scenes fall entirely within the DoF.

Because mobile devices have limited space for components, mobile devices generally include cameras with small apertures and small lenses, and that thus have long DoFs. Since most scenes fall entirely in a long DoF, it can be difficult or impossible for most mobile device cameras to capture images in which a first part of a scene is in the DoF and therefore in-focus and sharp, while a second part of the scene is out of the DoF and therefore out-of-focus and blurry.

BRIEF SUMMARY

In some examples, systems and techniques are described for processing image data. The techniques can use image data captured by multiple image sensors of multiple cameras of an imaging system as inputs to one or more trained machine learning (ML) systems to generate an image having a synthetic DoF. In some examples, the multiple cameras can include four cameras arranged on a surface in a diamond pattern. In some examples, the multiple cameras can include four cameras arranged on a surface in an inline pattern. The one or more trained ML systems can include one or more trained ML models, one or more trained neural networks (NNs), one or more trained convolutional neural networks (CNNs), one or more trained time delay neural networks (TDNNs), one or more trained support vector machines (SVMs), one or more trained random forests (RFs), or a combination thereof. The synthetic DoF can be shallower than the respective DoFs of the multiple cameras of the imaging system. The synthetic DoF can correspond to a simulated aperture size. In some examples, the synthetic DoF can simulate a DoF of a camera having an aperture with the simulated aperture size. The simulated aperture size can be larger than the respective aperture sizes of the apertures of the multiple cameras of the imaging system. In some examples, at least a first camera and a second camera of the multiple cameras of the imaging system can be offset from each other by an offset distance. This offset distance can correspond to the simulated aperture size. For instance, the offset distance can be the diameter of the simulated aperture size. The offset distance can be a function of the simulated aperture size. Once the imaging system generates the image with the synthetic DoF, the imaging system can output the image. Outputting the image can include displaying the image on a display. Outputting the image can include transmitting the image to a recipient device using a transmitter or a transceiver (e.g., a wired and/or wireless transmitter or transceiver).

In one example, an apparatus for image processing is provided. The apparatus includes a memory and one or more processors (e.g., implemented in circuitry) coupled to the memory. The one or more processors are configured to and can: receive first image data of a scene captured by a first image sensor; receive second image data of the scene captured by a second image sensor, wherein the first image sensor is offset from the second image sensor by an offset distance; generate, using at least the first image data and the second image data as inputs to one or more trained machine learning systems, an image having a synthetic depth of field corresponding to a simulated aperture size, wherein the simulated aperture size is associated with the offset distance; and output the image.

In another example, a method of image processing is provided. The method includes: receiving first image data of a scene captured by a first image sensor; receiving second image data of the scene captured by a second image sensor, wherein the first image sensor is offset from the second image sensor by an offset distance; generating, using at least the first image data and the second image data as inputs to one or more trained machine learning systems, an image having a synthetic depth of field corresponding to a simulated aperture size, wherein the simulated aperture size is associated with the offset distance; and outputting the image.

In another example, a non-transitory computer-readable medium is provided that has stored thereon instructions that, when executed by one or more processors, cause the one or more processors to: receive first image data of a scene captured by a first image sensor; receive second image data of the scene captured by a second image sensor, wherein the first image sensor is offset from the second image sensor by an offset distance; generate, using at least the first image data and the second image data as inputs to one or more trained machine learning systems, an image having a synthetic depth of field corresponding to a simulated aperture size, wherein the simulated aperture size is associated with the offset distance; and output the image.

In another example, an apparatus for image processing is provided. The apparatus includes: means for receiving first image data of a scene captured by a first image sensor; receiving second image data of the scene captured by a second image sensor, wherein the first image sensor is offset from the second image sensor by an offset distance; generating, using at least the first image data and the second image data as inputs to one or more trained machine learning systems, an image having a synthetic depth of field corresponding to a simulated aperture size, wherein the simulated aperture size is associated with the offset distance; and outputting the image.

In some aspects, the one or more processors are configured to generate, using at least the first image data and the second image data as inputs to the one or more trained machine learning systems, a disparity error map that identifies one or more disparity error regions corresponding to the image, wherein, to generate the image, the one or more processors are configured to generate the image based also on the disparity error map.

In some aspects, the one or more processors are configured to: generate downscaled first image data at least in part by downscaling the first image data; generate downscaled second image data at least in part by downscaling the second image data; generate, using at least the downscaled first image data and the downscaled second image data as inputs to the one or more trained machine learning systems, a second image having the synthetic depth of field; and generate, using at least the downscaled first image data and the downscaled second image data as inputs to the one or more trained machine learning systems, a second disparity error map that identifies a second set of one or more disparity error regions corresponding to the second image, wherein, to generate the image, the one or more processors are configured to generate the image to include one or more upscaled portions of the second image at one or more positions associated with a reduction in disparity error in the second disparity error map compared to the disparity error map.

In some aspects, the simulated aperture size is based on the offset distance. In some aspects, the simulated aperture size is a diameter of a simulated aperture corresponding to the synthetic depth of field. In some aspects, the simulated aperture size is an area of a simulated aperture corresponding to the synthetic depth of field.

In some aspects, the first image sensor being offset from the second image sensor by the offset distance includes a first optical axis associated with the first image sensor being offset from a second optical axis associated with the second image sensor by the offset distance.

In some aspects, the synthetic depth of field is shallower than at least one of a first depth of field corresponding to the first image sensor and a second depth of field corresponding to the second image sensor. In some aspects, the simulated aperture size is larger than a first aperture corresponding to the first image sensor and a second aperture corresponding to the second image sensor.

In some aspects, the one or more processors are configured to: receive third image data of the scene captured by a third image sensor, wherein, to generate the image, the one or more processors are configured to use at least the first image data and the second image data and the third image data as the inputs to the one or more trained machine learning systems. In some aspects, the one or more processors are configured to: receive fourth image data of the scene captured by a fourth image sensor, wherein, to generate the image, the one or more processors are configured to use at least the first image data and the second image data and the third image data and the fourth image data as the inputs to the one or more trained machine learning systems.

In some aspects, the one or more processors are configured to: receive an input indicating the synthetic depth of field. In some aspects, the one or more processors are configured to: identify that an object is depicted in the first image data; and automatically determine the synthetic depth of field, wherein the object is in-focus in the image based on the synthetic depth of field.

In some aspects, the image includes a first region that is in-focus and a second region that is blurred. In some aspects, the first region depicts a foreground, wherein the second region depicts a background.

In some aspects, the methods, apparatuses, and computer-readable medium described above further comprise: a display, wherein, to output the image, the one or more processors are configured to display the image using the display. In some aspects, the methods, apparatuses, and computer-readable medium described above further comprise: a communication transceiver, wherein, to output the image, the one or more processors are configured to send the image to a recipient device using the communication transceiver.

In some aspects, the methods, apparatuses, and computer-readable medium described above further comprise: the first image sensor; and the second image sensor.

In some aspects, the methods, apparatuses, and computer-readable medium described above further comprise: the image sensor.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
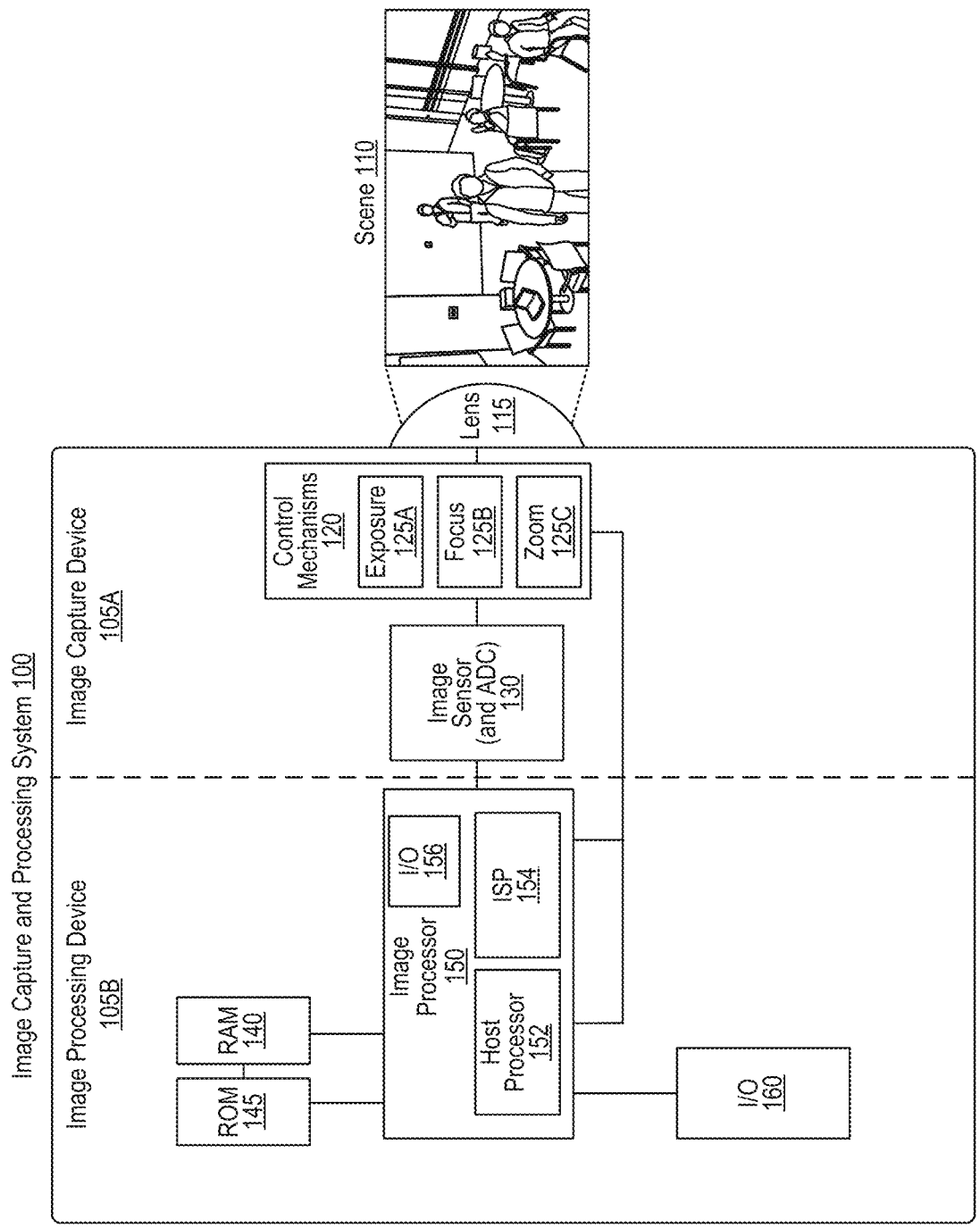
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

The depth of field (DoF) of a camera refers to a range of distances from a camera that a subject of an image can be positioned in order to appear in-focus and sharp in the image, rather than out-of-focus and blurry. The DoF of a camera can be a function of the aperture size of the camera and/or the focal length of the lens of the camera. For instance, cameras with larger apertures generally have shallower DoFs than cameras with smaller apertures. Similarly, cameras with longer focal lengths generally have shallower DoFs than cameras with shorter focal lengths.

Generally, it is desirable for a subject of a scene, such as a person or an animal or an important object, to be in-focus in an image of the scene, and therefore in the DoF of the camera while the image is being captured. However, it can also be desirable for parts of the scene other than the subject, such as the elements that are in the background or foreground relative to the subject, to be out-of-focus in the image, and therefore out of the DoF of the camera while the image is being captured. Images in which the subject is in-focus and other elements are out-of-focus help draw the eye to the subject and thus emphasize the subject in the image. For example, to capture an image of a person walking through a city in which the person is the subject, it may be desirable for the person to appear in-focus and clear in the image (e.g., the person is within the DoF), while the city around the person appears out-of-focus and blurry in the image (e.g., the city is outside of the DoF). However, if the subject of the image is intended to be the city rather than the person, it may be desirable for the person to appear out-of-focus and blurry in the image (e.g., the person is outside of the DoF), while the city appears in-focus and clear in the image (e.g., city is within the DoF).

Mobile devices, such as mobile handsets, wearable devices, and head-mounted display (HMD) devices, generally have very limited space for components. Thus, often, mobile devices include small cameras. Small cameras generally have small apertures and small lenses. The small cameras generally found in mobile devices generally have long DoFs due to the small apertures and small lenses. In images captured with cameras having long DoFs, the entire scene is often within the DoF, causing the entire scene to appear in-focus and clear. Thus, it can be difficult to capture an image of a scene with a small-aperture camera, such as camera in a mobile device, so that a first portion of the scene (e.g., a subject) appears in-focus and sharp in the image, while a second portion of the scene appears out-of-focus and blurry in the image.

A light-field camera, also known as a plenoptic camera, uses an array of micro-lenses in front of a large image sensor, and/or an array of small cameras. A light-field camera can capture information about a light field emanating from a scene, including direction of light rays. Image data captured using a light-field camera can be used to generate images simulating a wide range of DoFs. In some examples, the DoF of an image captured by a light-field camera can be adjusted after capture of the image based on storage of the information about the light field, allowing for post-capture changes in which portions of the scene appear in-focus and clear, and which portions of the scene appear out-of-focus and blurry. However, a light-field camera generally includes many cameras and/or lenses, which may occupy too much space to be widely used in mobile devices. For example, some light-field cameras include micro-lens arrays with tens of thousands of lenses.

One approach to produce synthetic DoF in an image includes capturing an image, performing image segmentation on the image to detect region(s) of the image that depict people, and selectively blurring all regions of the image that do not include people. This approach can be referred to as a "portrait mode." This approach suffers from some limitations, however. The desired subject of an image is not always a person, and may for example be an animal, a vehicle, a plant, a device, a structure, or another object. Image segmentation algorithms are generally programmed to detect specific types of desired subjects (e.g., people), and may be unable to detect different types of desired subjects (e.g., animals, structures, vehicles, plants, devices). Additionally, errors in image segmentation, for instance misclassifications around strands of hair or other complex regions, can lead to visual artifacts caused by blurring portions of the subject, or leaving non-subject portions of the scene unblurred. For example, image segmentation can misclassify portions of a scene at or near object boundaries, such as areas including strands of hair, fur, leaves, frayed fabrics, or other irregular edges.

Another approach to produce synthetic DoF in an image includes capturing an image, capturing depth information from a depth sensor, and selectively blurring portions of the image based on the depth information. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof. However, depth sensors can incorrectly classify depth at or near object boundaries. Some depth sensors, such as RADAR sensors, have difficulties detecting depths of certain types of materials (e.g., non-metallic objects for RADAR sensors). Some depth sensors have low resolutions and therefore have difficulties detecting small or narrow objects. Some depth sensors have difficulties detecting depth of objects facing certain direction, such as objects running parallel to an axis along which stereoscopic cameras are positioned. Depth sensors can also have issues correctly classifying depth for objects that are transparent, semi-transparent, or reflective. For example, a depth sensor generally cannot detect the depth of an object on the other side of a window relative to the depth sensor, instead sensing the depth of the window itself. Likewise, a depth sensor generally cannot detect the depth of an object reflected in a mirror, instead sensing the depth of the mirror itself.

Techniques are described herein for processing image data. The techniques can use image data captured by multiple image sensors of multiple cameras of an imaging system as inputs to one or more trained machine learning (ML) systems to generate an image having a synthetic DoF. In some examples, the multiple cameras can include four cameras arranged on a surface in a diamond pattern. In some examples, the multiple cameras can include four cameras arranged on a surface in an inline pattern. The one or more trained ML systems can include one or more trained ML models, one or more trained neural networks (NNs), one or more trained convolutional neural networks (CNNs), one or more trained time delay neural networks (TDNNs), one or more trained support vector machines (SVMs), one or more trained random forests (RFs), or a combination thereof. The synthetic DoF can be shallower than the respective DoFs of the multiple cameras of the imaging system. The synthetic DoF can correspond to a simulated aperture size. In some examples, the synthetic DoF can simulate a DoF of a camera having an aperture with the simulated aperture size. The simulated aperture size can be larger than the respective aperture sizes of the apertures of the multiple cameras of the imaging system. In some examples, at least a first camera and a second camera of the multiple cameras of the imaging system can be offset from each other by an offset distance. This offset distance can correspond to the simulated aperture size. For instance, the offset distance can be the diameter of the simulated aperture size. The offset distance can be a function of the simulated aperture size. Once the imaging system generates the image with the synthetic DoF, the imaging system can output the image. Outputting the image can include displaying the image on a display. Outputting the image can include transmitting the image to a recipient device using a transmitter or a transceiver (e.g., a wired and/or wireless transmitter or transceiver).

In some examples, the one or more ML systems can generate multiple sizes of the image with the simulated DoF. For instance, the one or more ML systems can generate a full-sized image, a half-sized image, and a quarter-sized image. In some examples, the one or more ML systems can generate only the full-sized image, and the half-sized image and quarter-sized image can be generated through downscaling.

In some examples, the one or more ML systems can generate a disparity error map. In some examples, the one or more ML systems can generate multiple sizes of the disparity error map, such as a full-sized disparity error map corresponding to disparity error in the full-sized image, a half-sized disparity error map corresponding to the half-sized image, and a quarter-sized disparity error map corresponding to the quarter-sized image. Generally, disparity error is reduced and/or determined with higher confidence at smaller image scales, so the quarter-sized disparity error map generally shows less disparity error than the full-sized disparity error map. The imaging system can modify the full-sized image to incorporate upscaled portions of the half-sized image and/or of the quarter-sized image in disparity error regions identified as having disparity error with high confidence in at least one of the disparity error maps.

The ML systems may be trained based on training data generated using a light-field camera. For instance, the training data can include image data from the multiple individual cameras of the camera array of the light-field camera (having the same positions as the multiple cameras of the imaging system described herein) as well as the output image produced by the light-field camera using the image data from the full camera array of the light-field camera.

Generating the image with the synthetic DoF by using the image data from the multiple cameras as inputs to one or more ML systems can provide technical improvements over other techniques for providing images with real DoF or synthetic DoF effects. For instance, generating the image with the synthetic DoF by using the image data from the multiple cameras as inputs to one or more ML systems allows a device to use a small number (e.g., 2, 3, 4, 5, 6, 7, 8, 9, 10, more than 10) small cameras with small apertures, and can thus save space over devices that require larger apertures and thus larger lenses, which generally include both increased diameters and thicknesses. Devices with small cameras with small apertures are also more durable than cameras with larger apertures and thus larger lenses, as larger lenses are more prone to scratches, cracks, warping, and other damage. Generating the image with the synthetic DoF by using the image data from the multiple cameras as inputs to one or more ML systems provides an output image that can focus on any desired subject, whereas synthetic DoF techniques that are based on image segmentation might only be able to focus an image on certain types of subjects (e.g., people). Generating the image with the synthetic DoF by using the image data from the multiple cameras as inputs to one or more ML systems provides an output image that can provide accurate focus even when a scene includes multiple possible subjects, whereas synthetic DoF techniques that are based on image segmentation can erroneously focus on two subjects of the same type (e.g., two people) even though the two subjects are actually at different depths from the camera and should not both be in focus. Generating the image with the synthetic DoF by using the image data from the multiple cameras as inputs to one or more ML systems provides an output image that is more accurate at object boundaries than synthetic DoF techniques that are based on image segmentation or depth sensor data from depth sensor(s). Generating the image with the synthetic DoF by using the image data from the multiple cameras as inputs to one or more ML systems provides an output image that can provide accurate focus even through glass or on a reflection of an object reflected in a reflective surface, whereas synthetic DoF techniques that are based on depth sensor data from depth sensor(s) generally cannot. Generating the image with the synthetic DoF by using the image data from the multiple cameras as inputs to one or more ML systems provides an output image that can provide post-capture changes in focus.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1710 discussed with respect to the computing system 1700. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1720, read-only memory (ROM) 145 and/or 1725, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1735, any other input devices 1745, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
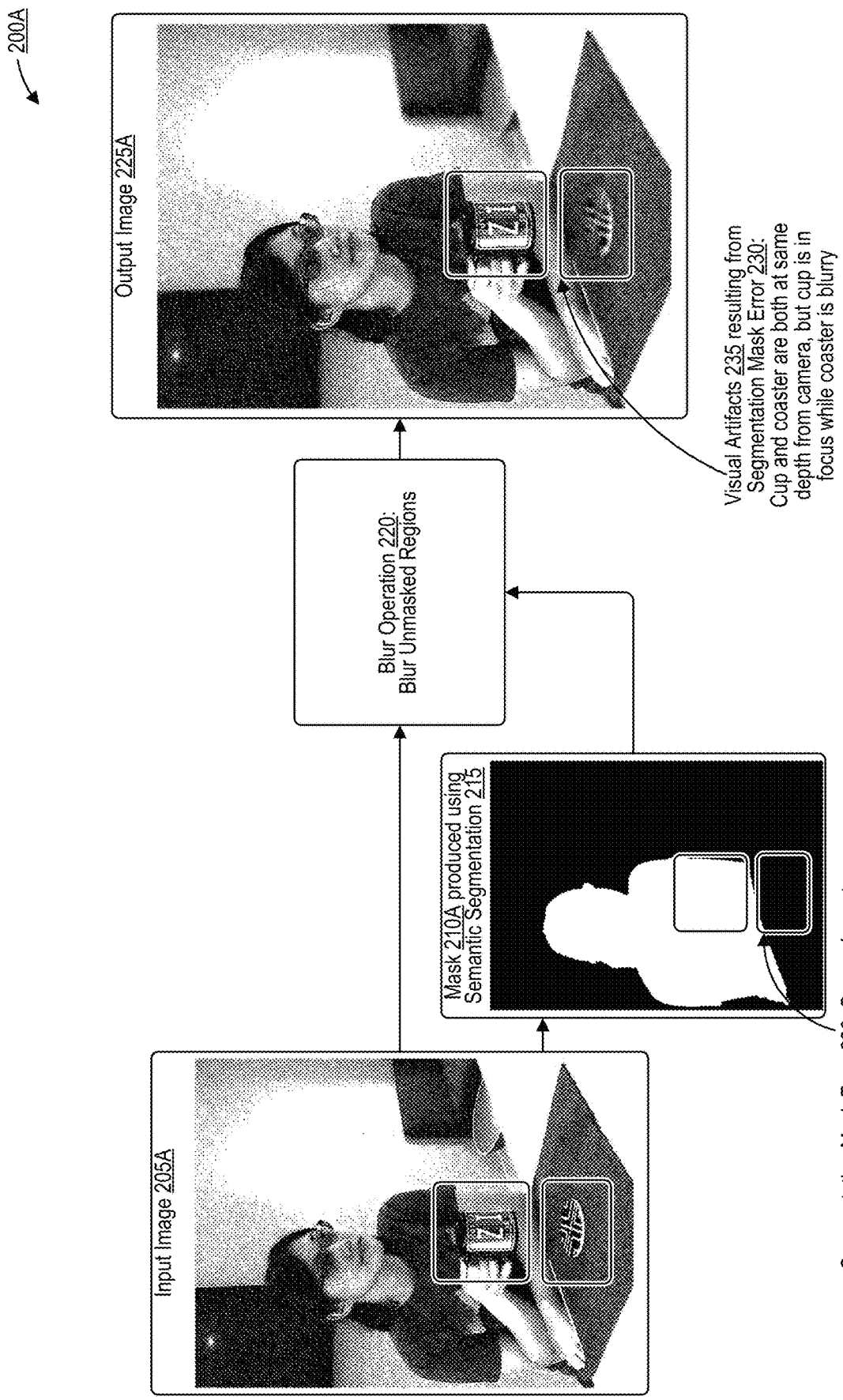
FIG. 2A is a block diagram illustrating blurring an input image of a woman holding a cup of coffee based on semantic segmentation to produce an output image with synthetic depth of field and with visual artifacts, in accordance with some examples.

FIG. 2A is a block diagram 200A illustrating blurring an input image 205A of a woman holding a cup of coffee based on semantic segmentation 215 to produce an output image 225A with synthetic depth of field and with visual artifacts 235. An imaging system captures the input image 205A using an image sensor, such as the image sensor 130. In the input image 205A, the woman is depicted holding the cup over a table with a coaster on it. The cup and the coaster have approximately the same depth (distance from the camera) as one another, and the woman appears to have lifted the cup vertically off of the coaster. The imaging system can use one or more trained machine learning (ML) systems to perform semantic segmentation 215 of the input image 205A and generate the mask 210A. The one or more trained machine learning (ML) systems that perform the semantic segmentation 215 can be trained to detect one or more categories of object (e.g., one or more people) in one or more images that are provides as inputs to the one or more trained machine learning (ML) systems. Thus, in the example of FIG. 2A, the mask 210A generated by the semantic segmentation 215 highlights the woman holding the cup in the input image 205A. According to the mask 210A, the portion of the input image 205A depicting woman holding the cup is masked, while the rest of the input image 205A is unmasked.

The imaging system uses the mask 210A performs a blur operation 220. The blur operation 220 includes the imaging system blurring the unmasked areas of the input image 205A based on the mask 210A generated through the semantic segmentation 215. By performing the blur operation 220 on the input image 205A, the imaging system generates the output image 225A.

However, the mask 210A includes segmentation mask errors 230, which lead to visual artifacts 235 in the output image 225A. For instance, despite the cup and the coaster in the input image 205A being positioned at approximately the same depth from the camera, the cup is masked in the mask 210A while the coaster is not masked in the mask 210A. These segmentation mask errors 230, highlighted using two rounded rectangles overlaid over the mask 210A in FIG. 2A, lead to visual artifacts 235 in the output image 225A. The visual artifacts 235 in the output image 225A, highlighted using two rounded rectangles overlaid over the output image 225A in FIG. 2A, result in the cup appearing in focus and sharp in the output image 225A, while the coaster appears out of focus and blurry in the output image 225A. These visual artifacts 235 make the synthetic DoF effect in the output image 225A appear incorrect and unrealistic.

Use of semantic segmentation to produce an output image with synthetic DoF, such as the output image 225A, can be referred to as a "portrait mode." This semantic-segmentation-based approach to producing an output image with synthetic DoF suffers from some limitations. The desired subject of an image is not always a person, and may for example be an animal, a vehicle, a plant, a device, a structure, or another object. Image segmentation algorithms are generally programmed to detect specific types of desired subjects (e.g., people as in the semantic segmentation 215 of FIG. 2A), and may be unable to detect different types of desired subjects (e.g., animals, structures, vehicles, plants, devices, or the coaster of FIG. 2A).

Figure 2B:
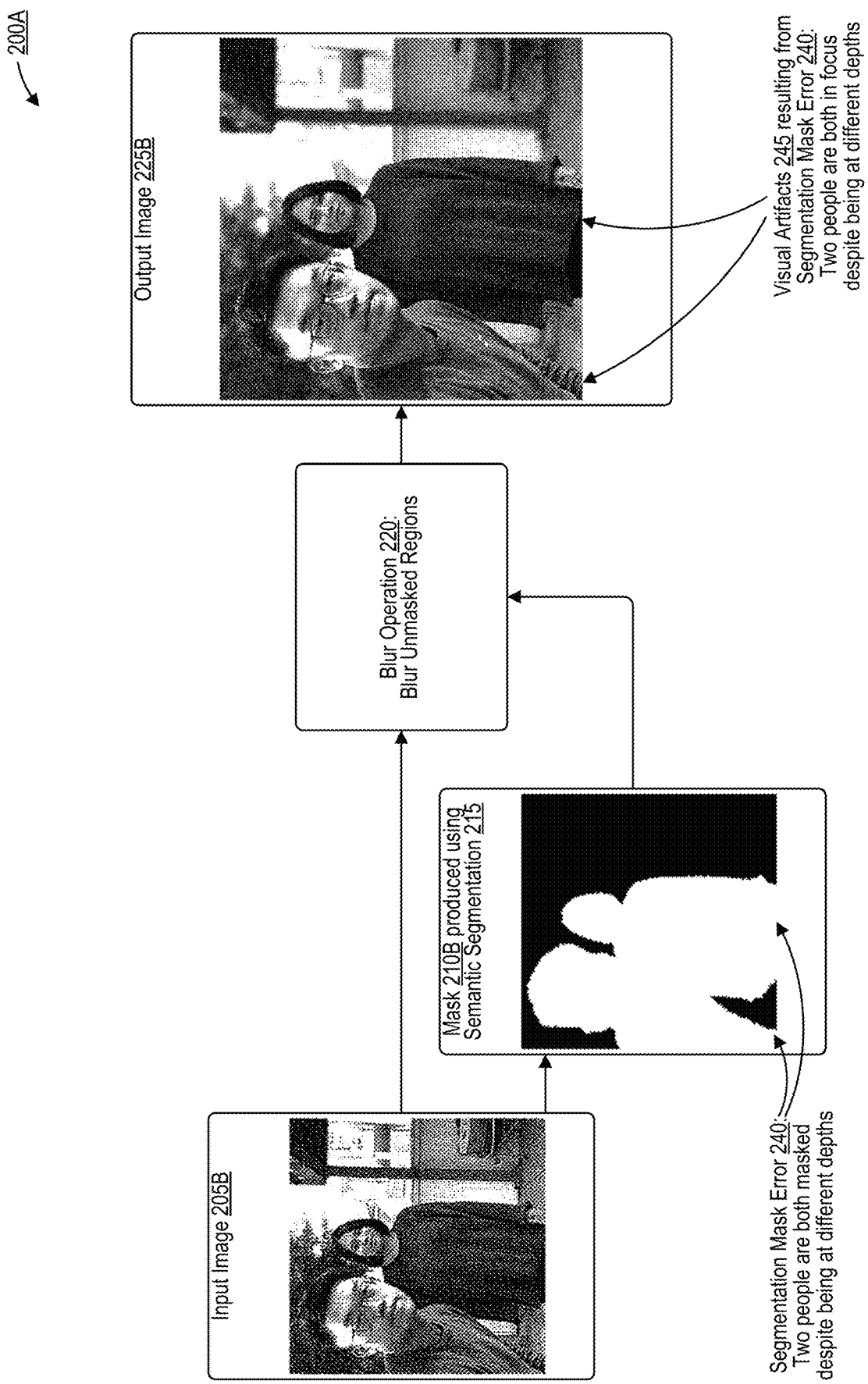
FIG. 2B is a block diagram illustrating blurring an input image of a man and a woman based on semantic segmentation to produce an output image with synthetic depth of field and with visual artifacts, in accordance with some examples.

Additionally, this semantic-segmentation-based approach to producing an output image with synthetic DoF can erroneously focus on two subjects of the same type (e.g., two people) even though the two subjects are actually at different depths from the camera and should not both be in focus. This issue is illustrated in FIG. 2B. Additionally, errors in image segmentation, for instance misclassifications around strands of hair or other complex regions, can lead to visual artifacts caused by blurring portions of the subject, or leaving non-subject portions of the scene unblurred. For example, image segmentation can misclassify portions of a scene at or near object boundaries, such as areas including strands of hair, fur, leaves, frayed fabrics, or other irregular edges. This issue is illustrated in FIG. 2C.

FIG. 2B is a block diagram 200B illustrating blurring an input image 205B of a man and a woman based on semantic segmentation 215 to produce an output image 225B with synthetic depth of field and with visual artifacts 245. The imaging system captures the input image 205B using an image sensor, such as the image sensor 130. The imaging system can use one or more trained machine learning (ML) systems to perform semantic segmentation 215 of the input image 205B and generate the mask 210B. The imaging system uses the mask 210B performs a blur operation 220 in which the imaging system blurs the unmasked areas of the input image 205B based on the mask 210B. By performing the blur operation 220 on the input image 205B, the imaging system generates the output image 225B.

As in FIG. 2A, the one or more trained machine learning (ML) systems that perform the semantic segmentation 215 are trained to detect people. Thus, the mask 210B includes the man and the woman in the input image 205B in the mask 210B, with the rest of the input image 205B unmasked. The mask 210B includes segmentation mask errors 240, which lead to visual artifacts 245 in the output image 225B. For instance, despite the woman being depicted behind the man in the input image 205B, the woman and the man are both masked in the mask 210B, and are thus equally in focus and sharp in the output image 225B. In a true DoF image, the man and the woman would have different focus levels due to the woman being depicted behind the man in the input image 205B. Thus, the visual artifacts 245 in the output image 225B include the woman and the man appearing equally in focus and sharp in the output image 225B. These visual artifacts 245 make the synthetic DoF effect in the output image 225B appear incorrect and unrealistic.

Figure 2C:
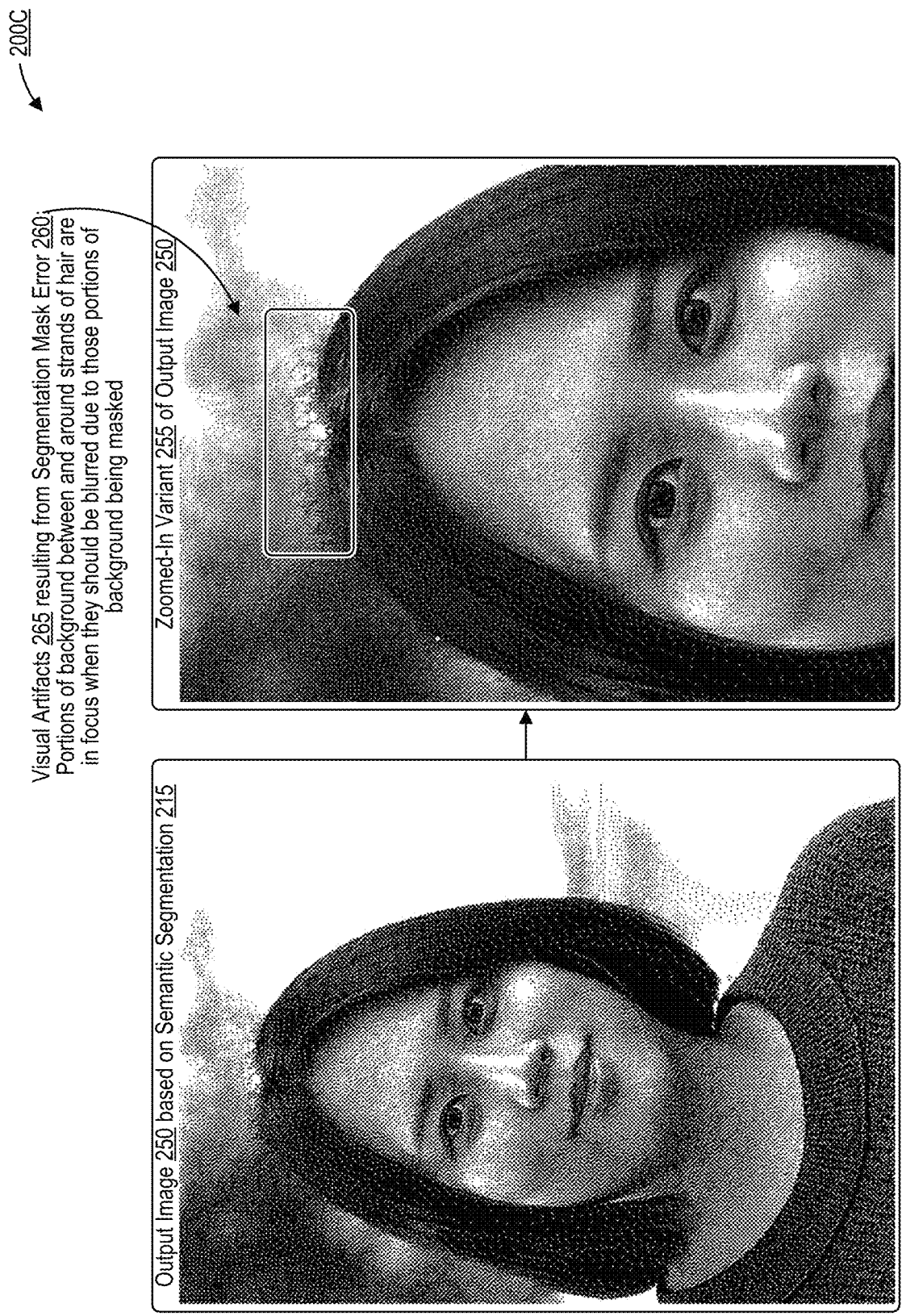
FIG. 2C is a conceptual diagram illustrating an output image of a woman produced by blurring an input image of the woman based on semantic segmentation to simulate depth of field with visual artifacts, in accordance with some examples.

FIG. 2C is a conceptual diagram illustrating an output image 250 of a woman produced by blurring an input image of the woman based on semantic segmentation 215 to simulate depth of field with visual artifacts 265. The output image 250 generally depicts a woman who appears in-focus and sharp in front of a background that appears out-of-focus and blurry. An imaging system generates the output image 250 using a semantic segmentation 215 as illustrated in, and discussed with respect to, FIGS. 2A and 2B. A zoomed-in variant 255 of the output image 250 highlights visual artifacts 265 in the output image 250 that result from a segmentation mask error 260. The visual artifacts 265, highlighted using a rounded rectangle overlaid over the zoomed-in variant 255 of the output image 250 in FIG. 2C, include areas of background between and around the hair of the woman being incorrectly in-focus and sharp, while the remainder of the background is correctly out-of-focus and blurry. These visual artifacts 265 are caused by segmentation mask errors 260 in the semantic segmentation 215 that include incorrect segmentation, and thus masking, of the areas of background between and around the hair of the woman. The semantic segmentation 215 incorrectly categorizes these areas of background between and around the hair of the woman as part of the woman. These visual artifacts 265 make the synthetic DoF effect in the output image 250 appear incorrect and unrealistic.

Figure 3:
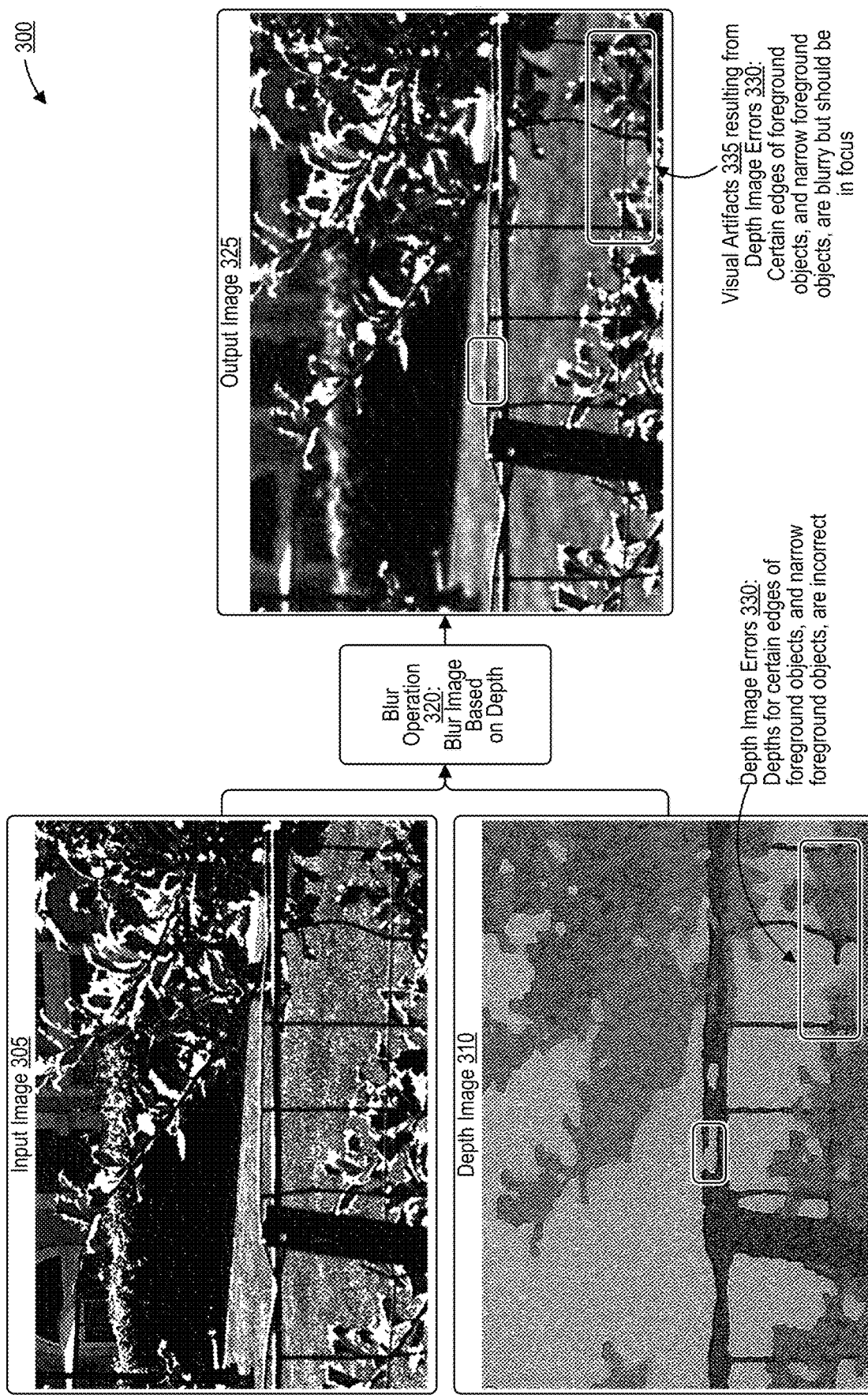
FIG. 3 is a block diagram illustrating blurring an input image of a fence based on a depth image of the fence to produce an output image with synthetic depth of field and with visual artifacts, in accordance with some examples.

FIG. 3 is a block diagram illustrating blurring an input image 305 of a fence based on a depth image 310 of the fence to produce an output image 325 with synthetic depth of field and with visual artifacts 335. An imaging system captures the input image 305 using an image sensor, such as the image sensor 130. The imaging system captures the depth image 310 using a depth sensor. Depth sensors can include, for example, light detection and ranging (LiDAR) sensors, radio detection and ranging (RADAR) sensors, sound detection and ranging (SODAR) sensors, sound navigation and ranging (SONAR) sensors, time of flight (ToF) sensors, structured light sensors, stereoscopic cameras, or combinations thereof. In the depth image 310, darker portions of the depth image 310 have a shorter depth (e.g., are closer to the depth sensor at time of capture of the depth image 310) while brighter portions of the depth image 310 have a longer depth (e.g., are farther from the depth sensor at time of capture of the depth image 310). The depth image 310 identifies that portions of the fence in the center of the input image 305, portions of a table upon which the fence rests toward the bottom of the input image 305, and leaves of a plant on the right-hand side of the input image 305, are all in the foreground, while other portions of the input image 305 are in the background.

The imaging system uses the depth image 310 to performs a blur operation 320. The blur operation 320 includes the imaging system blurring portions of the input image 305 that the depth image 310 identifies as being in the background of the input image 305, while leaving portions of the input image 305 that the depth image 310 identifies as being in the foreground of the input image 305 sharp and clear. By performing the blur operation 320 on the input image 305, the imaging system generates the output image 325.

However, the depth image 310 includes depth image errors 330, which lead to visual artifacts 335 in the output image 325. The depth image errors 330, highlighted using two rounded rectangles overlaid over the depth image 310 in FIG. 3, include inaccuracies in depth mapping at and around boundaries of objects, and inaccuracies in depth mapping of narrow objects with horizontal orientations. For instance, the fence depicted in the input image 305 includes a grid of metal bars with vertically-oriented metal bars and horizontally-oriented metal bars perpendicular to the vertically-oriented metal bars. While the depth image 310 identifies the vertically-oriented metal bars of the fence as being in the foreground, the depth image errors 330 include the depth image 310 largely failing to identify most of the horizontally-oriented metal bars of the fence as being in the foreground. Because of this, the output image 325 includes visual artifacts 335 in which the horizontally-oriented metal bars of the fence incorrectly appear blurry and out-of-focus, while the vertically-oriented metal bars of the fence correctly appear clear and in-focus. The visual artifacts 335 are highlighted using two rounded rectangles overlaid over the output image 325 in FIG. 3.

Additional depth image errors 330 include inaccuracies in depth at and around the boundaries of the leaves of the plant at the right-hand-side of the input image 305. These depth image errors 330 result in visual artifacts 335 in which some portions of the leaves of the plant incorrectly appear blurry and out-of-focus, while other portions of the leaves of the plant correctly appear in-focus and clear. These visual artifacts 335 make the synthetic DoF effect in the output image 325 appear incorrect and unrealistic.

This depth-sensor-based approach to producing an output image with synthetic DoF can also result in visual artifacts caused by depth image issues at or near other object boundaries, such as areas including strands of hair, fur, leaves, frayed fabrics, or other irregular edges, similarly to the issue is illustrated in FIG. 2C. Additionally, some depth sensors, such as RADAR sensors, have difficulties detecting depths of certain types of materials (e.g., non-metallic objects for RADAR sensors), which can produce depth image issues in which objects of those types of materials do not appear at the correct depth in the depth image, resulting in visual artifacts produced as a result of the imaging system incorrectly blurring the object (or incorrectly failing to blur the object) during the blur operation 320.

Some depth sensors have low resolutions and therefore have difficulties detecting small or narrow objects, which may have been one cause of the depth image errors 330 with the depth image 310 failing to identify the horizontally-oriented metal bars of the fence as being in the foreground. Some depth sensors have difficulties detecting depth of objects facing certain direction, such as objects running parallel to an axis along which stereoscopic cameras are positioned. This, too, may have been a cause of the depth image errors 330 with the depth image 310 failing to identify the horizontally-oriented metal bars of the fence as being in the foreground.

Depth sensors can also have issues correctly classifying depth for objects that are transparent, semi-transparent, or reflective. For example, a depth sensor generally cannot detect the depth of an object on the other side of a window relative to the depth sensor, instead sensing the depth of the window itself. Likewise, a depth sensor generally cannot detect the depth of an object reflected in a mirror, instead sensing the depth of the mirror itself. Thus, the depth-sensor-based approach to producing an output image with synthetic DoF, if given the input image 1505 of FIG. 15, would not be able to produce the first output image 1510 or the second output image 1515 of FIG. 15.

Figure 4:
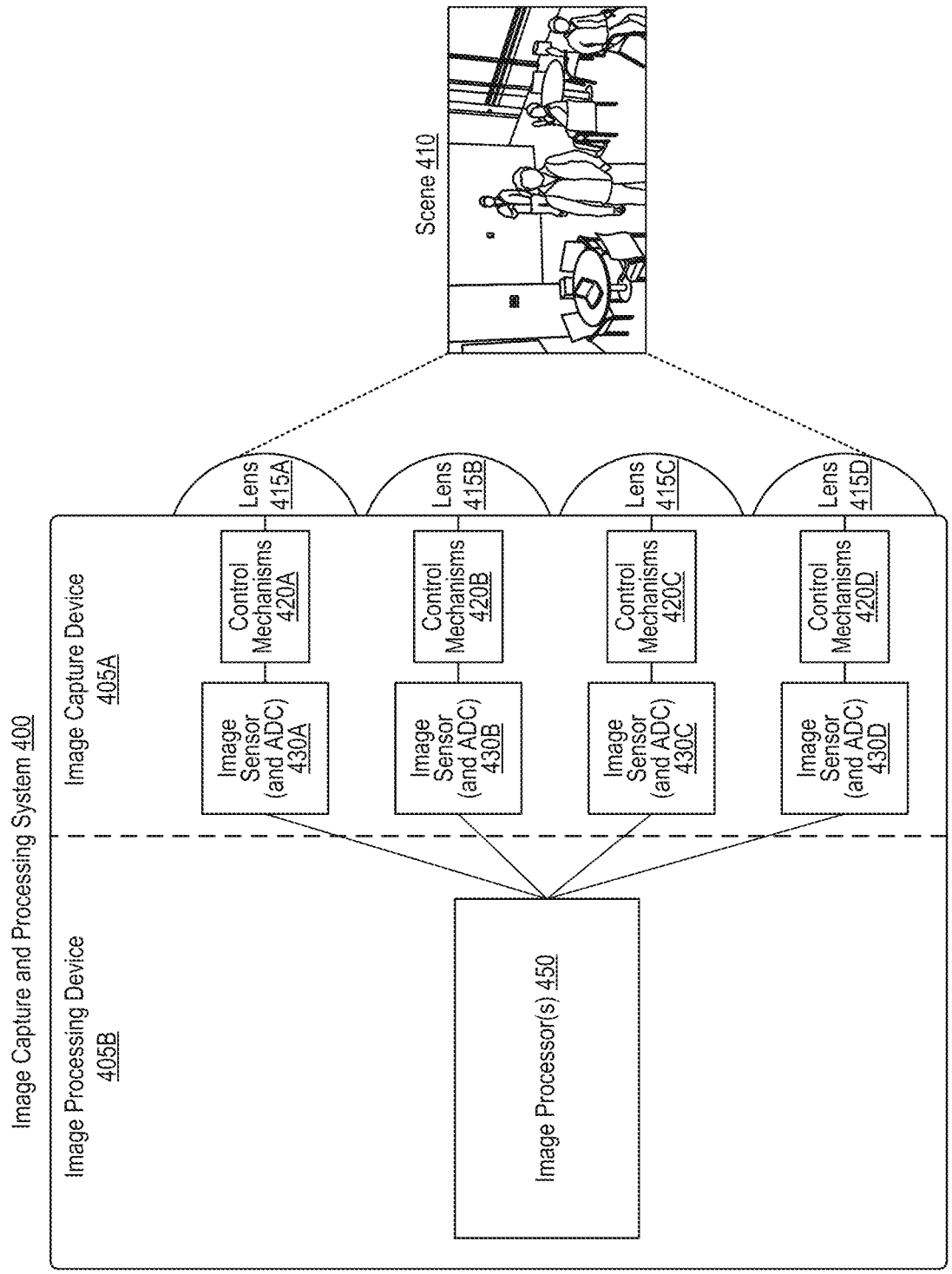
FIG. 4 is a block diagram illustrating an example architecture of an image capture and processing system with multiple image sensors, in accordance with some examples.

FIG. 4 is a block diagram illustrating an example architecture of an image capture and processing system 400 with multiple image sensors 430A-430D. Similarly to the image capture and processing system 100 of FIG. 1 being divided into the image capture device 105A and the image processing device 105B, the image capture and processing system 400 of FIG. 4 is divided into the image capture device 405A and the image processing device 405B.

The image capture device 405A includes four lenses 415A-415D, including a lens 415A, a lens 415B, a lens 415C, and a lens 415D. Each of the four lenses 415A-415D can include any type of lens discussed with respect to the lens 115 of FIG. 1.

The image capture device 405A includes four sets of control mechanisms 420A-420D, including a set of control mechanisms 420A, a set of control mechanisms 420B, a set of control mechanisms 420C, and a set of control mechanisms 420D. Each set of control mechanisms of the four sets of control mechanisms 420A-420D can include any type of control mechanisms discussed with respect to the set of control mechanisms 120 of FIG. 1. For example, each set of control mechanisms of the four sets of control mechanisms 420A-420D can include one or more exposure control mechanisms 125A, one or more focus control mechanisms 125B, one or more zoom control mechanisms 125C, and/or one or more additional control mechanisms (e.g., control mechanisms controlling analog gain, flash, HDR, depth of field, and/or other image capture properties).

The image capture device 405A includes four image sensors 430A-430D, including an image sensor 430A, an image sensor 430B, an image sensor 430C, and an image sensor 430D. Each of the four image sensors 430A-430D can include any type of image sensor discussed with respect to the image sensor 130 of FIG. 1. Each of the four image sensors 430A-430D can include any of the additional components discussed with respect to the image sensor 130 of FIG. 1, such as an analog gain amplifier and/or an analog to digital converter (ADC).

Light from a scene 410 can enter each of the four lenses 415A-415D, with zoom, exposure, focus, and/or other aspects of capture controlled using the each of the four sets of control mechanisms 420A-420D. The light from the scene 410 can pass through each of the four lenses 415A-415D and be received by each of the four image sensors 430A-430D. Each of the four image sensors 430A-430D, and/or other components included therewith (e.g., an analog gain amplifier and/or an ADC) may amplify and convert the image data collected at the each of the four image sensors 430A-430D into digital signals, which the image capture device 405A can provide to one or more image processor(s) 450 of the image processing device 405B.

Each image processor of the one or more image processor(s) 450 can include at least a subset of the image processor 150 of FIG. 1 and/or elements branching therefrom, such as the ISP 154, the host processor 152, the I/O 156, the RAM 140, the ROM 145, the I/O 160, or a combination thereof. In some examples, a single image processor of the one or more image processor(s) 450 can process image data from two or more (e.g., two, three, or four) of the four image sensors 430A-430D. In some examples, the one or more image processor(s) 450 include a plurality of image processors 450. In some examples, the image processing device 405B includes an image processors 450 specifically processes image data from one image sensor of the four image sensors 430A-430D without processing image data from other image sensors of the four image sensors 430A-430D.

In an illustrative example, light from the scene 410 may pass through the lens 415A based on capture settings set at the set of control mechanisms 420A, and may be received by the image sensor 430A. The image sensor 430A and/or other components included therewith (e.g., an analog gain amplifier and/or an ADC) may amplify and convert the image data and send the image data to one or more of the one or more image processor(s) 450, which may process the image data to capture an image. Similarly, light from the scene 410 may pass through the lens 415B based on capture settings set at the set of control mechanisms 420B, and may be received by the image sensor 430B. The image sensor 430B and/or other components included therewith (e.g., an analog gain amplifier and/or an ADC) may amplify and convert the image data and send the image data to one or more of the one or more image processor(s) 450, which may process the image data to capture an image. Similar processes may be performed by the image capture and processing system 400 to capture an image using the lens 415C, the set of control mechanisms 420C, the image sensor 430C and/or other components included therewith, and one or more of the one or more image processor(s) 450. Similar processes may be performed by the image capture and processing system 400 to capture an image using the lens 415D, the set of control mechanisms 420D, the image sensor 430D and/or other components included therewith, and one or more of the one or more image processor(s) 450.

In some examples, the one or more image processor(s) 450 of the image processing device 405B can include one or more image processors that input the image data from the image sensors 430A-430D, before or after processing by the one or more image processor(s) 450, into one or more trained machine learning (ML) models, in order to generate an output image with synthetic depth of field. Examples of aspects of this process are illustrated in, and discussed with respect to, FIGS. 6, 7, 8A-8B, 9, 10A-10C, 11A-11B, 12, 13, 14, 15, and 16. In some examples, at least one of the one or more image processor(s) 450 can include at least a subset of a computing system 1700. In some examples, at least one of the one or more image processor(s) 450 can train and/or run one or more trained machine learning models, for example by training and/or running the neural network (NN) 900, the trained NN 1005A, the trained NN 1005B, the trained NN 1005C, or a combination thereof. In some examples, at least one of the one or more image processor(s) 450 can train one or more trained machine learning models using training data provided by one or more light field cameras, for instance using the training data 1110 and/or the training data 1120 from the light field camera 1140 of FIGS. 11A-11B.

Imaging devices with image sensors 430A-430D as in the image capture and processing system 400 of FIG. 4 can be used to capture image sets that can be used as inputs to one or more trained machine learning (ML) models to produce an output image with a synthetic DoF as illustrated in, or discussed with respect to, FIGS. 6, 7, 8A-8B, 9, 10A-10C, 11A-11B, 12, 13, 14, 15, and 16. In some examples, however, at least one of these image sensors 430A-430D may be removed. For instance, an image set with two or three images captured by two or three of the image sensors 430A-430D can be used as inputs to one or more trained machine learning (ML) models to produce an output image with a synthetic DoF. In some examples, one or more additional image sensors 430A-430D may be added. For instance, an image set with five or six images captured by five or six image sensors 430A-430D can be used as inputs to one or more trained machine learning (ML) models to produce an output image with a synthetic DoF. In some examples, a single one of the image sensors 430A-430D can act as two or more of the image sensors 430A-430D, with movement of the single one of the image sensors 430A-430D guided by an actuated motor moving the image sensor or guided by a user moving the single one of the image sensors 430A-430D manually (e.g., according to instructions displayed by a display). In an illustrative example, an imaging device can include a single image sensor (e.g., image sensor 430A) that can be moved to multiple positions, either manually by a user or via the imaging device actuating a motor that moves the single image sensor to those positions. The positions that the single image sensor is moved to can correspond to the positions of the other image sensors (e.g., the image sensors 430B-430D). Thus, image data from the single image sensor can be used in place of image data from all four image sensors 430A-430D based on the positions that the single image sensor is moved to, for instance for the purpose of providing input images to the one or more trained ML models to produce an output image with a synthetic DoF.

Figure 5C:
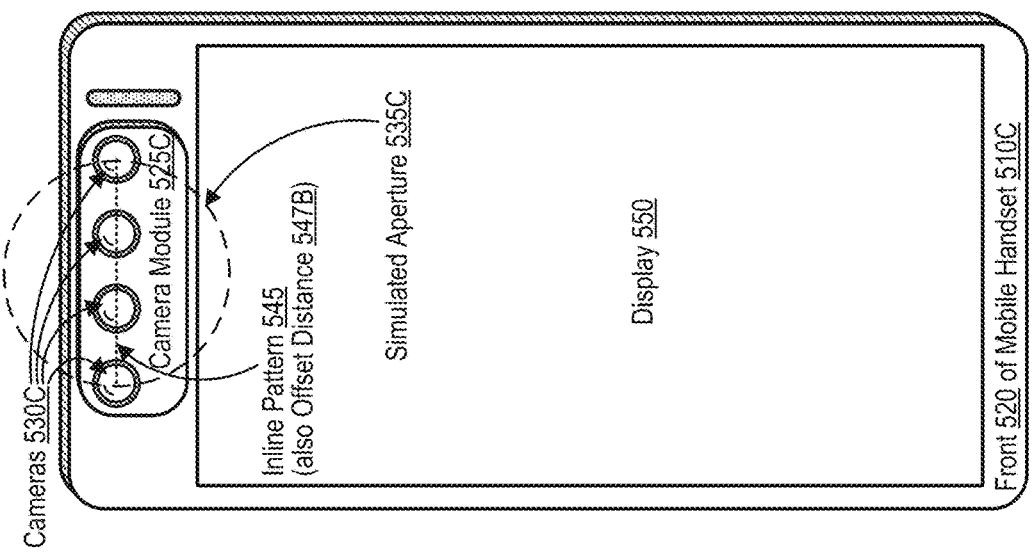
FIG. 5C is a perspective diagram illustrating a front of a mobile handset that includes a camera module with four cameras arranged in an inline pattern for use in generating an output image with synthetic depth of field based on a simulated aperture, in accordance with some examples.
Figure 5B:
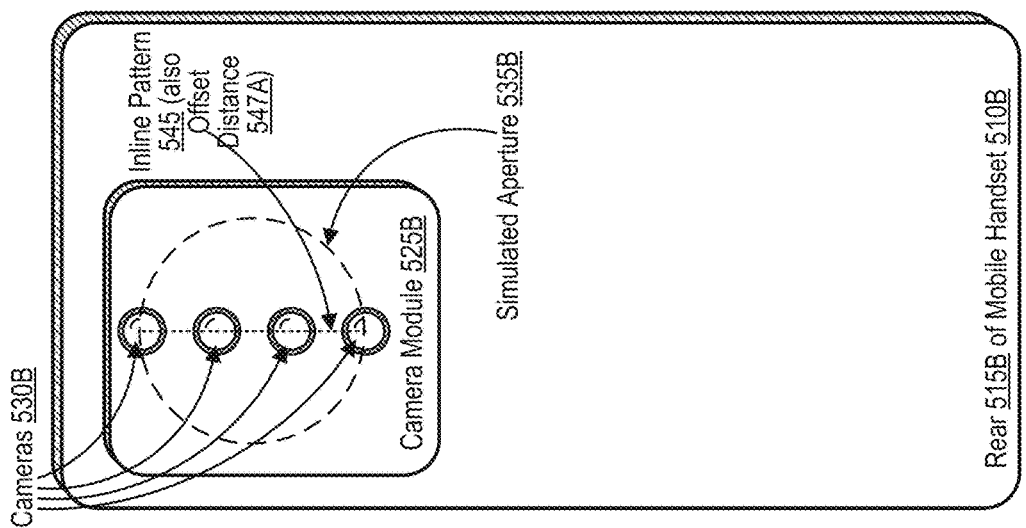
FIG. 5B is a perspective diagram illustrating a rear of a mobile handset that includes a camera module with four cameras arranged in an inline pattern for use in generating an output image with synthetic depth of field based on a simulated aperture, in accordance with some examples.
Figure 5A:
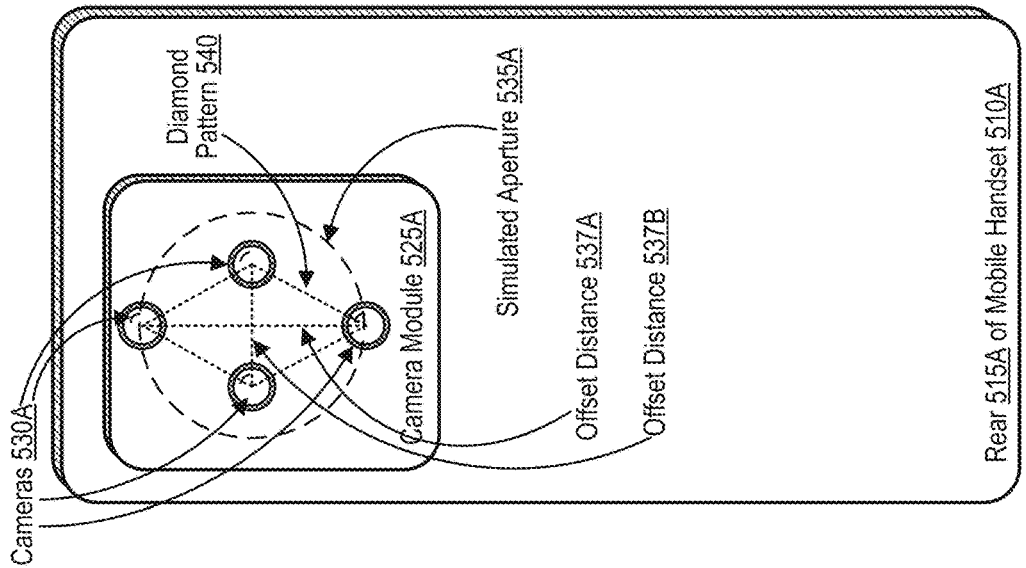
FIG. 5A is a perspective diagram illustrating a rear of a mobile handset that includes a camera module with four cameras arranged in a diamond pattern for use in generating an output image with synthetic depth of field based on a simulated aperture, in accordance with some examples.

FIG. 5A is a perspective diagram illustrating a rear 515A of a mobile handset 510A that includes a camera module 525A with four cameras 530A arranged in a diamond pattern 540 for use in generating an output image with synthetic depth of field based on a simulated aperture 535A. The mobile handset 510A, and/or the camera module 525A, can be an example of the image capture and processing system 400. For example, each of the cameras 530A of the camera module 525A can correspond to one of the four lenses 415A-415D, the corresponding one of the four sets of control mechanisms 420A-420D, the corresponding one of the four image sensors 430A-430D, and/or a corresponding one or more image processors of the one or more image processors 450.

The cameras 530A are arranged within the camera module 525A in a diamond pattern 540 that is outlined in FIG. 5A using dotted lines overlaid over the camera module 525A. The diamond pattern 540 may be referred to as a diamond layout, a diamond orientation, a diamond positioning, a diamond arrangement, a diamond setup, or a combination thereof. The cameras 530A arranged in the diamond pattern 540 are included within a simulated aperture 535A that is outlined in FIG. 5A using a dashed line overlaid over the camera module 525A. As part of the diamond pattern 540, an offset distance 537A between two of the cameras 530A (e.g., the top camera and the bottom camera) spans a diameter of the simulated aperture 535A (e.g., vertically). In some examples, the diamond pattern 540 can be modified so that an offset distance 537B between the other two of the cameras 530A (e.g., the left camera and the right camera) also spans the diameter of the simulated aperture 535A (e.g., horizontally). The sides of the diamond pattern 540 can also represent other offset distances between other pairs of the cameras 530A. In some examples, the arrangement of the cameras 530A in the diamond pattern 540 can be rotated about an axis perpendicular to the surface of the rear 515A of the mobile handset 510A to any rotation angle. In some examples, a simulated aperture may be referred to as a synthetic aperture.

FIG. 5B is a perspective diagram illustrating a rear 515B of a mobile handset 510B that includes a camera module 525B with four cameras arranged in an inline pattern 545 for use in generating an output image with synthetic depth of field based on a simulated aperture 535B. The mobile handset 510B, and/or the camera module 525B, can be an example of the image capture and processing system 400. For example, each of the cameras 530B of the camera module 525B can correspond to one of the four lenses 415A-415D, the corresponding one of the four sets of control mechanisms 420A-420D, the corresponding one of the four image sensors 430A-430D, and/or a corresponding one or more image processors of the one or more image processors 450.

The cameras 530B are arranged within the camera module 525B in an inline pattern 545 that is outlined in FIG. 5B using a vertical dotted line overlaid over the camera module 525B. The inline pattern 545 may be referred to as an inline layout, an inline orientation, an inline positioning, an inline arrangement, an inline setup, or a combination thereof. The cameras 530B arranged in the inline pattern 545 are included within a simulated aperture 535B that is outlined in FIG. 5B using a dashed line overlaid over the camera module 525B. As part of the inline pattern 545, an offset distance 547A between two of the cameras 530B (e.g., the top-most camera and the bottom-most camera) spans a diameter of the simulated aperture 535B (e.g., vertically). Other offset distances can also be measured between other pairs of the cameras 530B. In some examples, the arrangement of the cameras 530B in the inline pattern 545 can be rotated about an axis perpendicular to the surface of the rear 515B of the mobile handset 510B to any rotation angle.

FIG. 5C is a perspective diagram illustrating a front 520 of a mobile handset 510C that includes a camera module 525C with four cameras 530C arranged in an inline pattern 545 for use in generating an output image with synthetic depth of field based on a simulated aperture. The front 520 of the mobile handset 510C includes a display 550, and the camera module 525C with the cameras 530C is included in a bezel of the display 550. In some examples, the camera module 525C with the cameras 530C is included underneath the display 500 so that the camera module 525C with the cameras 530C is inside a housing of the mobile handset 510C and so that the cameras 530C receive light that passes through the display 550. In arrangements where the cameras 530C receive light that passes through the display 550 in this manner, the cameras 530C can be referred to as under-display cameras. In some examples, any of the cameras 530A, the cameras 530B, and/or the cameras 530C can be under-display cameras.

The mobile handset 510C, and/or the camera module 525C, can be an example of the image capture and processing system 400. For example, each of the cameras 530C of the camera module 525C can correspond to one of the four lenses 415A-415D, the corresponding one of the four sets of control mechanisms 420A-420D, the corresponding one of the four image sensors 430A-430D, and/or a corresponding one or more image processors of the one or more image processors 450.

The cameras 530C are arranged within the camera module 525C in an inline pattern 545 that is outlined in FIG. 5C using a horizontal dotted line overlaid over the camera module 525C. The inline pattern 545 of FIG. 5C is similar to the inline pattern 545 of FIG. 5B, but is horizontal rather than vertical. The cameras 530C arranged in the inline pattern 545 are included within a simulated aperture 535C that is outlined in FIG. 5C using a dashed line overlaid over the camera module 525C and otherwise within FIG. 5C. As part of the inline pattern 545, an offset distance 547B between two of the cameras 530C (e.g., the left-most camera and the right-most camera) spans a diameter of the simulated aperture 535C (e.g., horizontally). Other offset distances can also be measured between other pairs of the cameras 530B. In some examples, the arrangement of the cameras 530C in the inline pattern 545 can be rotated about an axis perpendicular to the surface of the front 520 of the mobile handset 510C to any rotation angle.

In some examples, the camera module 525C can be modified to include the cameras 530C in a diamond pattern 540 as in FIG. 5A. In some examples, the arrangement of the cameras 530C in the diamond pattern 540 can be rotated about an axis perpendicular to the surface of the front 520 of the mobile handset 510C to any rotation angle.

Imaging devices with cameras 530A-530C arranged as in the camera modules 525A-525C of FIGS. 5A-5C can be used to capture image sets that can be used as inputs to one or more trained machine learning (ML) models to produce an output image with a synthetic DoF as illustrated in, or discussed with respect to, FIGS. 6, 7, 8A-8B, 9, 10A-10C, 11A-11B, 12, 13, 14, 15, and 16. In some examples, however, at least one of these cameras 530A-530C may be removed. For instance, an image set with two or three images captured by two or three of the cameras 530A-530C can be used as inputs to one or more trained machine learning (ML) models to produce an output image with a synthetic DoF. In some examples, one or more additional cameras 530A-530C may be added. For instance, an image set with five or six images captured by five or six cameras 530A-530C can be used as inputs to one or more trained machine learning (ML) models to produce an output image with a synthetic DoF. In some examples, a single one of the cameras 530A-530C can act as two or more of the cameras 530A-530C, with movement of the single one of the cameras 530A-530C guided by an actuated motor moving the camera or guided by a user moving the single one of the cameras 530A-530C manually (e.g., according to instructions displayed by the display 550). In an illustrative example, an imaging device can include a single image sensor (e.g., an image sensor of one of the cameras 530A) that can be moved to multiple positions, either manually by a user or via the imaging device actuating a motor that moves the single image sensor to those positions. The positions that the single image sensor is moved to can correspond to the positions of the other image sensors (e.g., the image sensors of the cameras 530B-530D). Thus, image data from the single image sensor can be used in place of image data from all four image sensors of the cameras 530A-530D based on the positions that the single image sensor is moved to, for instance for the purpose of providing input images to the one or more trained ML models to produce an output image with a synthetic DoF.

Figure 6:
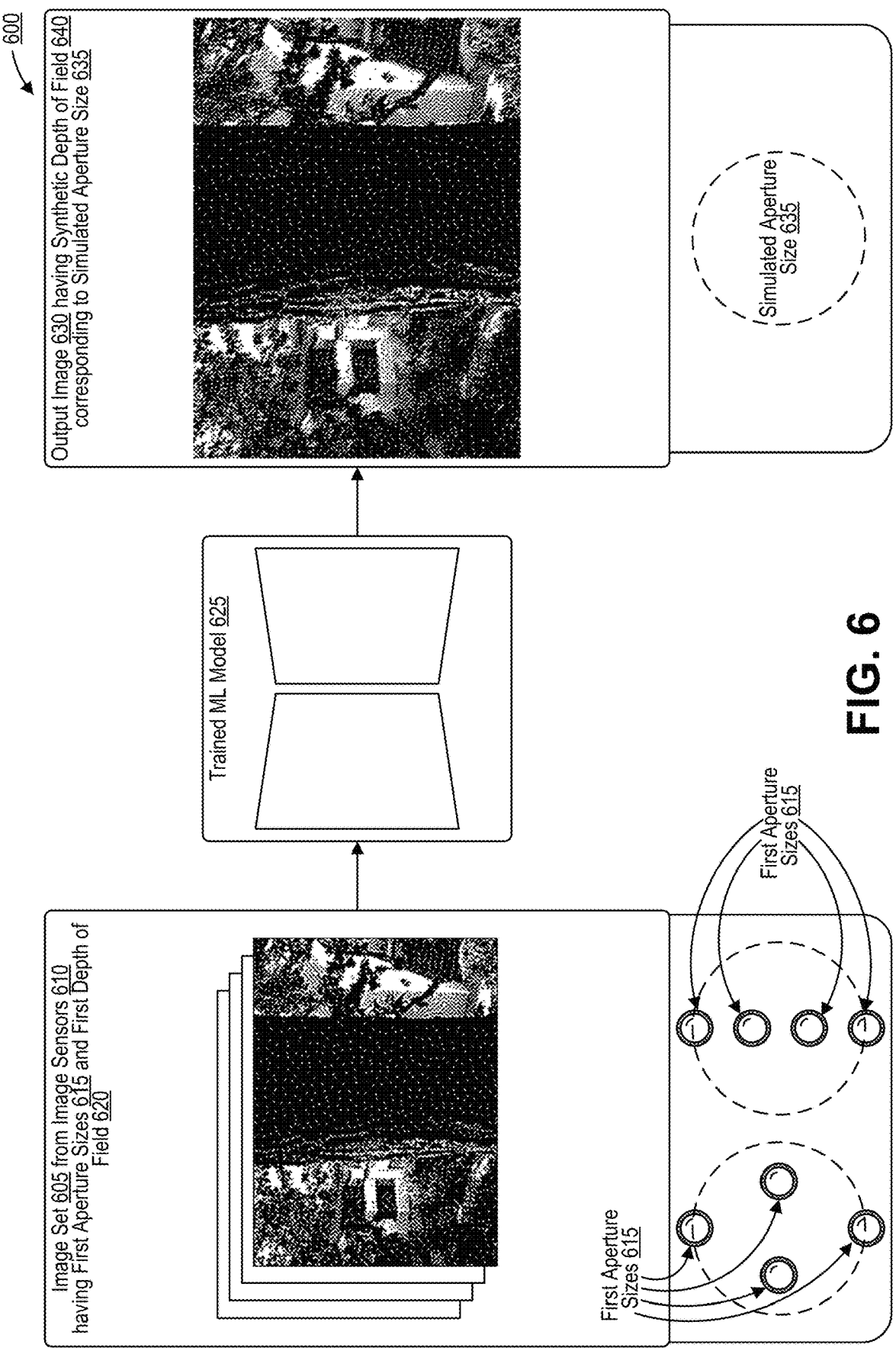
FIG. 6 is a block diagram illustrating generating an image having a synthetic depth of field corresponding to a simulated aperture size by using an image set captured by multiple image sensors as inputs to a trained machine learning model, in accordance with some examples.

FIG. 6 is a block diagram 600 illustrating generating an output image 630 having a synthetic depth of field 640 corresponding to a simulated aperture size 635 by using an image set 605 captured by multiple image sensors 610 as inputs to a trained machine learning model 625. The image set 605 includes multiple images (e.g., four images) captured by a set of image sensors 610 of an imaging system. In some examples, the image sensors 610 can include the image sensors 430A-430D of the image capture and processing system 400, the image sensors of the cameras 530A of the mobile handset 510A, the image sensors of the cameras 530B of the mobile handset 510B, the image sensors of the cameras 530C of the mobile handset 510C, an image sensor 130 of an image capture and processing system 100, or a combination thereof. At least a subset of the image sensors 610 that capture the image data (e.g., the images) of the image set 605 correspond to a first aperture size 615 and/or a first DoF 620. The first DoF 620 can result at least in part from the first aperture size 615. The first aperture size 615 can be a size of the apertures of at least a subset of the cameras to which the at least a subset of the image sensors 610 belongs. For example, the first aperture size 615 can refer to an aperture size of the apertures of the cameras 530A arranged in the diamond pattern 540 and/or of the cameras 530B arranged in the inline pattern 545, each of which are illustrated, without the dotted lines, below the image set 605 in FIG. 6.

Figure 9:
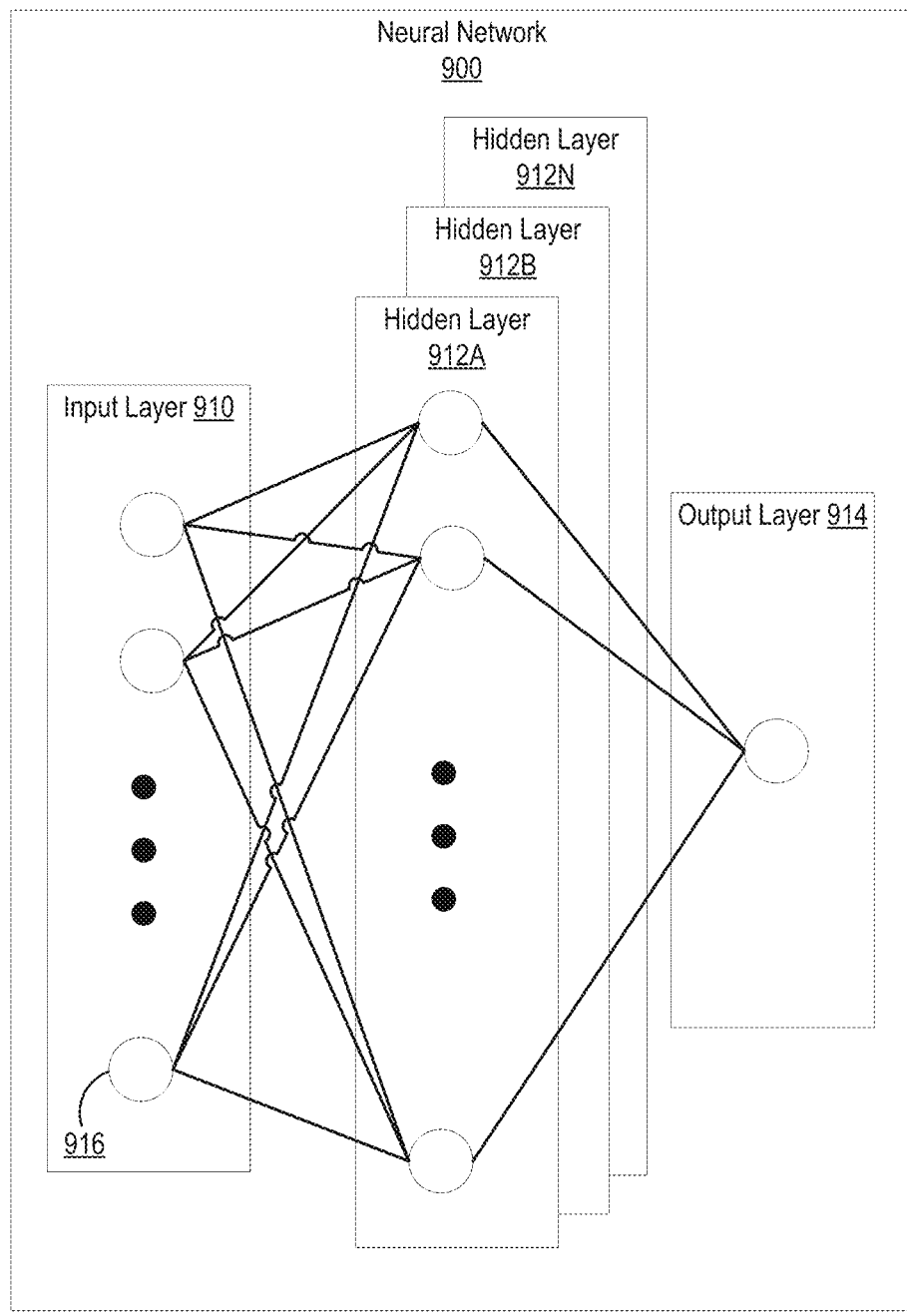
FIG. 9 is a block diagram illustrating an example of a neural network that can be used by the trained machine learning system that generates images with synthetic depth of field and/or that generates disparity error maps, in accordance with some examples.
Figure 10A:
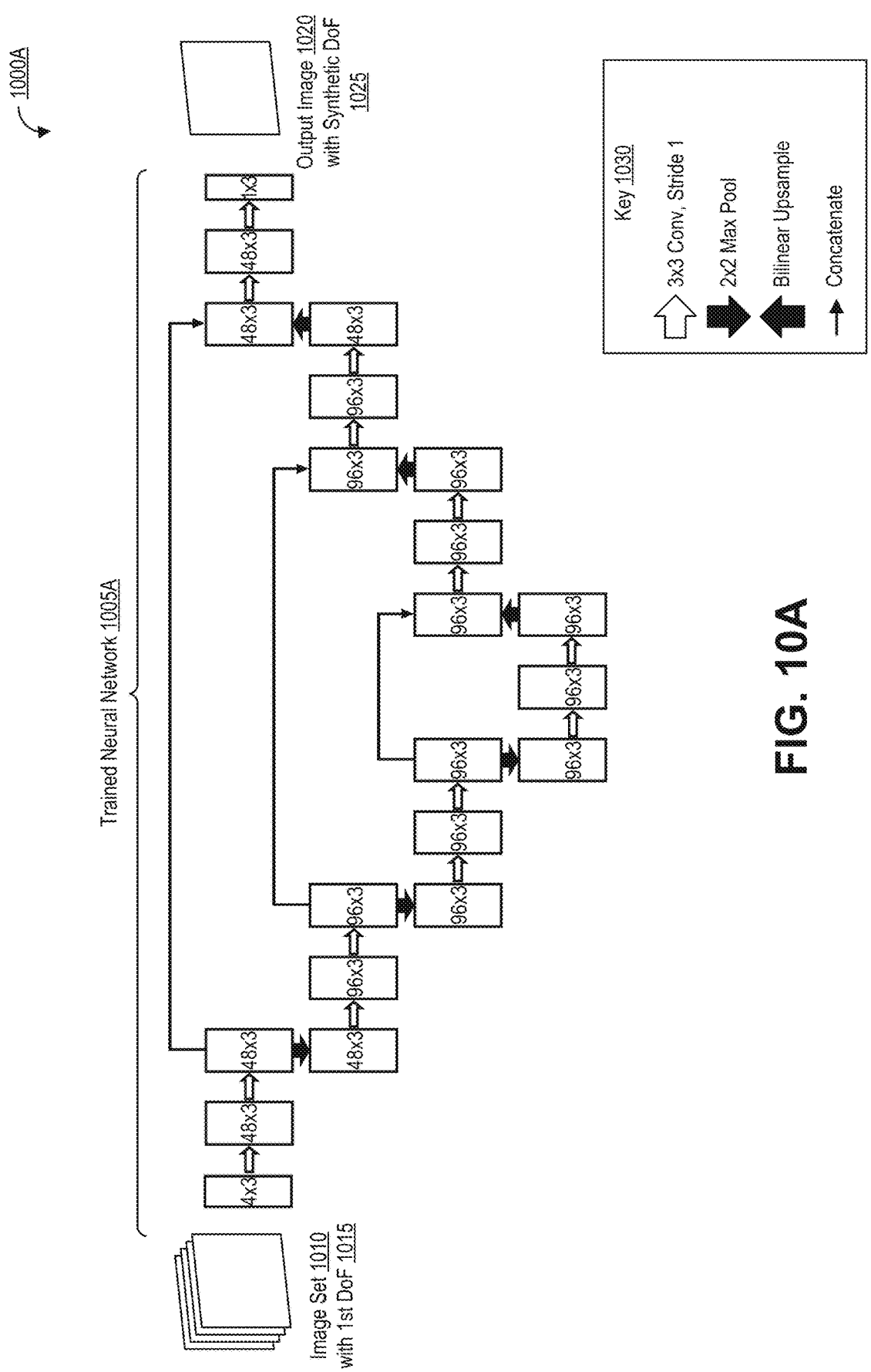
FIG. 10A is a block diagram illustrating an example of a neural network architecture of a trained neural network of the trained machine learning model that generates an output image with a synthetic depth of field based on an image set at a first depth of field, in accordance with some examples.
Figure 11B:
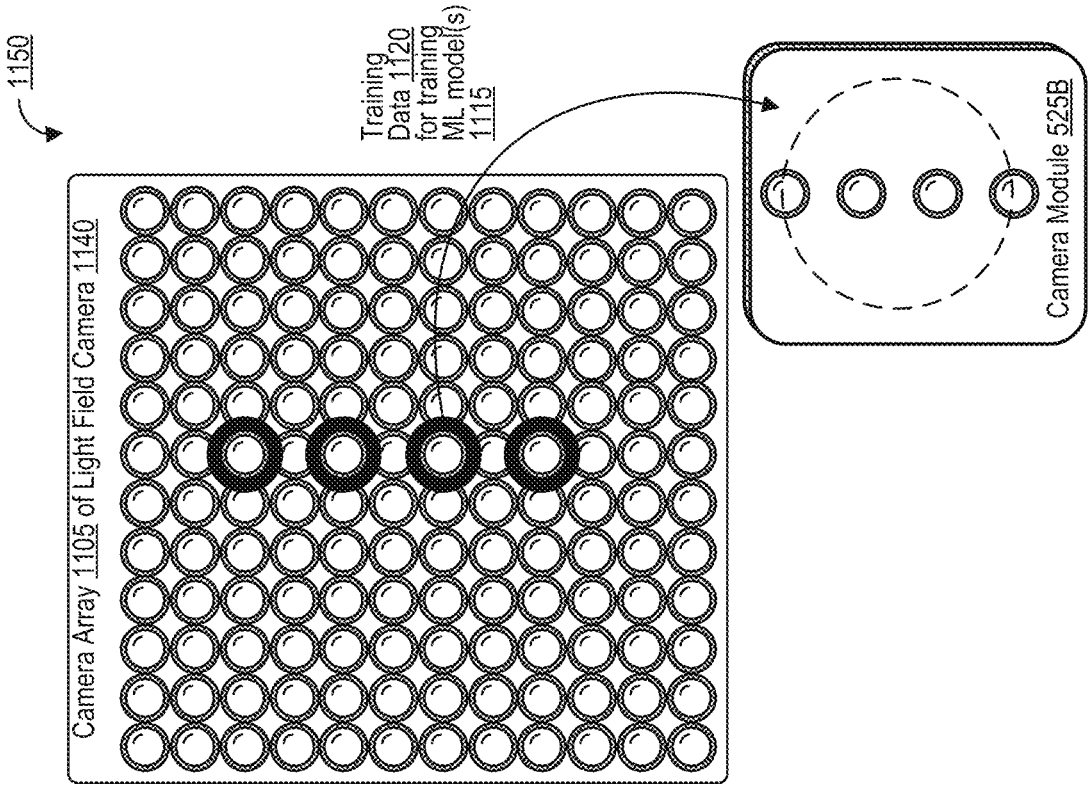
FIG. 11B is a conceptual diagram illustrating an example of selected cameras from a camera array of a light field camera that may be used to provide training data to train the one or more trained machine learning models to process image data from image sensors arranged in an inline pattern, in accordance with some examples.
Figure 11A:
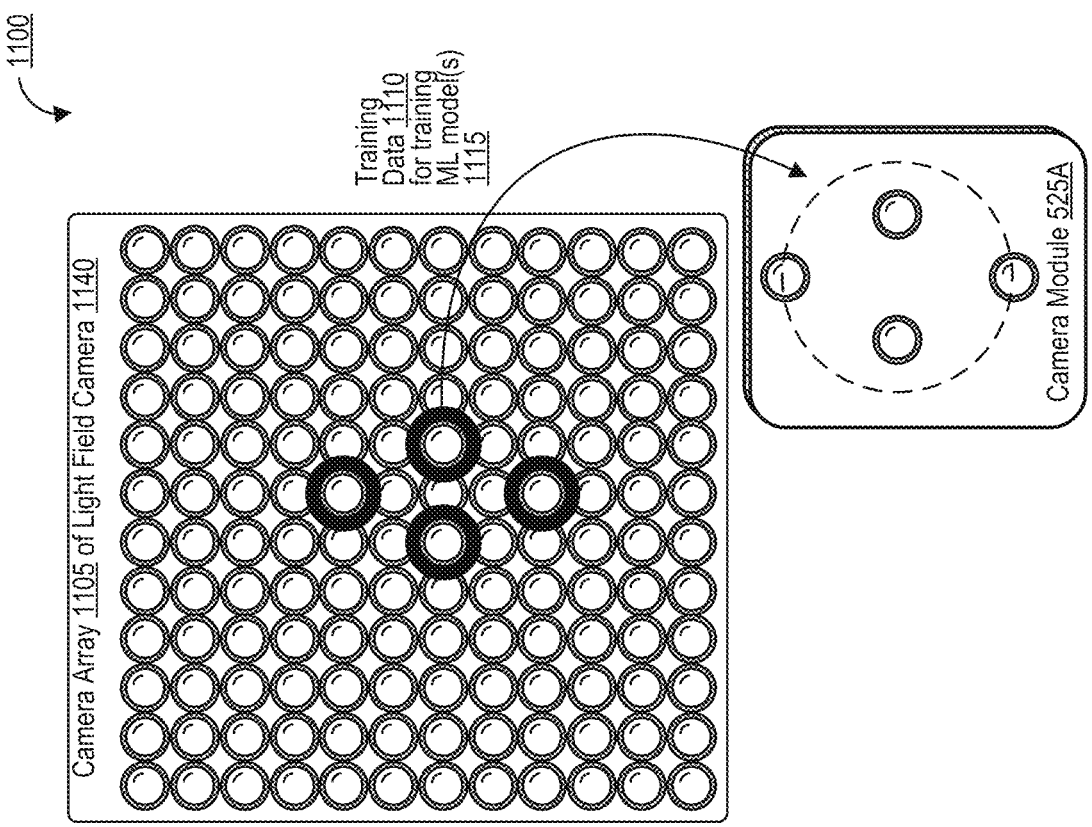
FIG. 11A is a conceptual diagram illustrating an example of selected cameras from a camera array of a light field camera that may be used to provide training data to train the one or more trained machine learning models to process image data from image sensors arranged in a diamond pattern, in accordance with some examples.

The image data (e.g., the images) of the image set 605 depicts a tree trunk in front of a background. The background includes both plants and houses. The imaging system uses the image data (e.g., the images) of the image set 605 as inputs to a trained machine learning (ML) model 625 of the imaging system. Examples of the trained ML model 625 are illustrated in FIG. 9 and FIG. 10A. Examples of training data for training the trained ML model 625 is illustrated in FIGS. 11A-11B.

The trained ML model 625 of the imaging system generates an output image 630 based on the image data (e.g., the images) of the image set 605. The output image 630 is an image characterized by a synthetic DoF 640. The synthetic DoF 640 can be shallower than the first DoF 620. The synthetic DoF 640 can simulate a DoF to be produced by a camera photographing the same scene as is depicted in the image set 605, but with a camera having an aperture of the simulated aperture size 635 instead of the first aperture size 615. The simulated aperture size 635 can be larger than the first aperture size 615, for instance as illustrated in FIG. 6, FIG. 7, FIGS. 8A-8B, and with respect to the cameras 530A-530C and simulated apertures 535A-535C of FIGS. 5A-5C. The output image 630 depicts the tree trunk as clear and in-focus, while depicting the background behind the tree trunk as blurry and out-of-focus.

Figure 7:
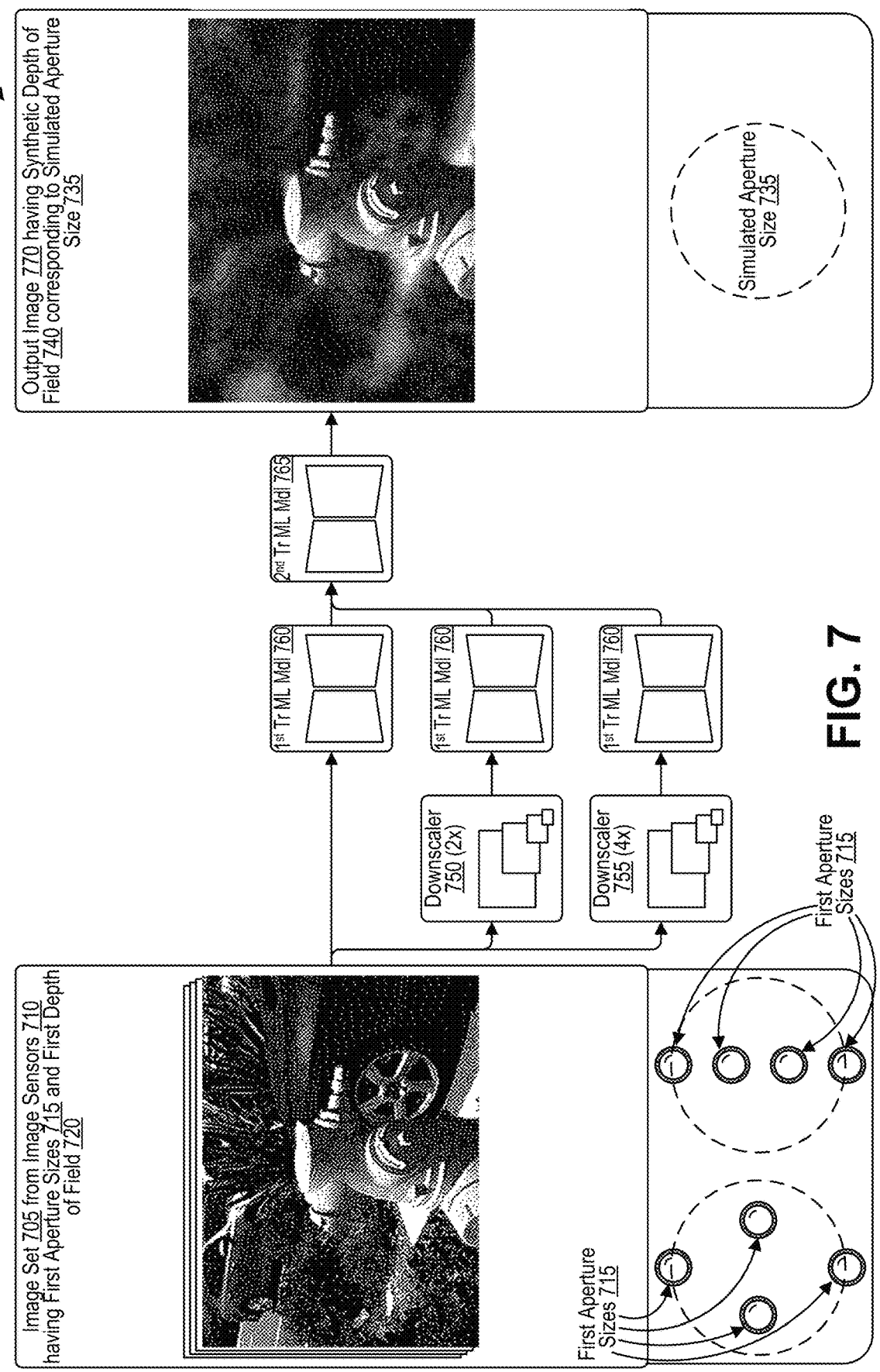
FIG. 7 is a block diagram illustrating generating an image having a synthetic depth of field corresponding to a simulated aperture size by using the image set from the multiple image sensors, and the downscaled variants of the image set, as inputs to a first trained machine learning model, the outputs of which are used as inputs to a second trained machine learning model, in accordance with some examples.

FIG. 7 is a block diagram 700 illustrating generating an output image 767 having a synthetic depth of field 740 corresponding to a simulated aperture size 735 by using an image set 705 captured by multiple image sensors 710, and downscaled variants of the image set, as inputs to a first trained machine learning model 760, the outputs of which are used as inputs to a second trained machine learning model 765. The image set 705 includes multiple images (e.g., four images) captured by a set of image sensors 710 of an imaging system. In some examples, the image sensors 710 can include the image sensors 430A-430D of the image capture and processing system 400, the image sensors of the cameras 530A of the mobile handsets 510A-510C, the image sensors of the cameras 530B of the mobile handset 510B, the image sensors of the cameras 530C of the mobile handset 510C, an image sensor 130 of an image capture and processing system 100, or a combination thereof. At least a subset of the image sensors 710 that capture the image data (e.g., the images) of the image set 705 correspond to a first aperture size 715 and/or a first DoF 720. The first DoF 720 can result at least in part from the first aperture size 715. The first aperture size 715 can be a size of the apertures of at least a subset of the cameras to which the at least a subset of the image sensors 710 belongs. For example, the first aperture size 715 can refer to an aperture size of the apertures of the cameras 530A arranged in the diamond pattern 540 and/or of the cameras 530B arranged in the inline pattern 545, each of which are illustrated, without the dotted lines, below the image set 705 in FIG. 7. In some examples, the image sensors 710 can be the image sensors 610. In some examples, the first aperture size 715 can be the first aperture size 615.

The image data (e.g., the images) of the image set 705 depicts a fire hydrant in front of a background. The background includes plants and two cars on a portion of a road. The imaging system downscales the image data (e.g., the images) of the image set 705 by 2× using a downscaler 750, resulting in a variant of the image set 705 downscaled to half the size of the image set 705. The imaging system downscales the image data (e.g., the images) of the image set 705 by 4× using a downscaler 755, resulting in a variant of the image set 705 downscaled to a quarter of the size of the image set 705. In some examples, the imaging system downscales the variant of the image data (e.g., the images) of the image set 705 that was downscaled by 2× using the downscaler 750 by another 2× using the downscaler 755, resulting in a net downscaling of 4×.

Figure 10B:
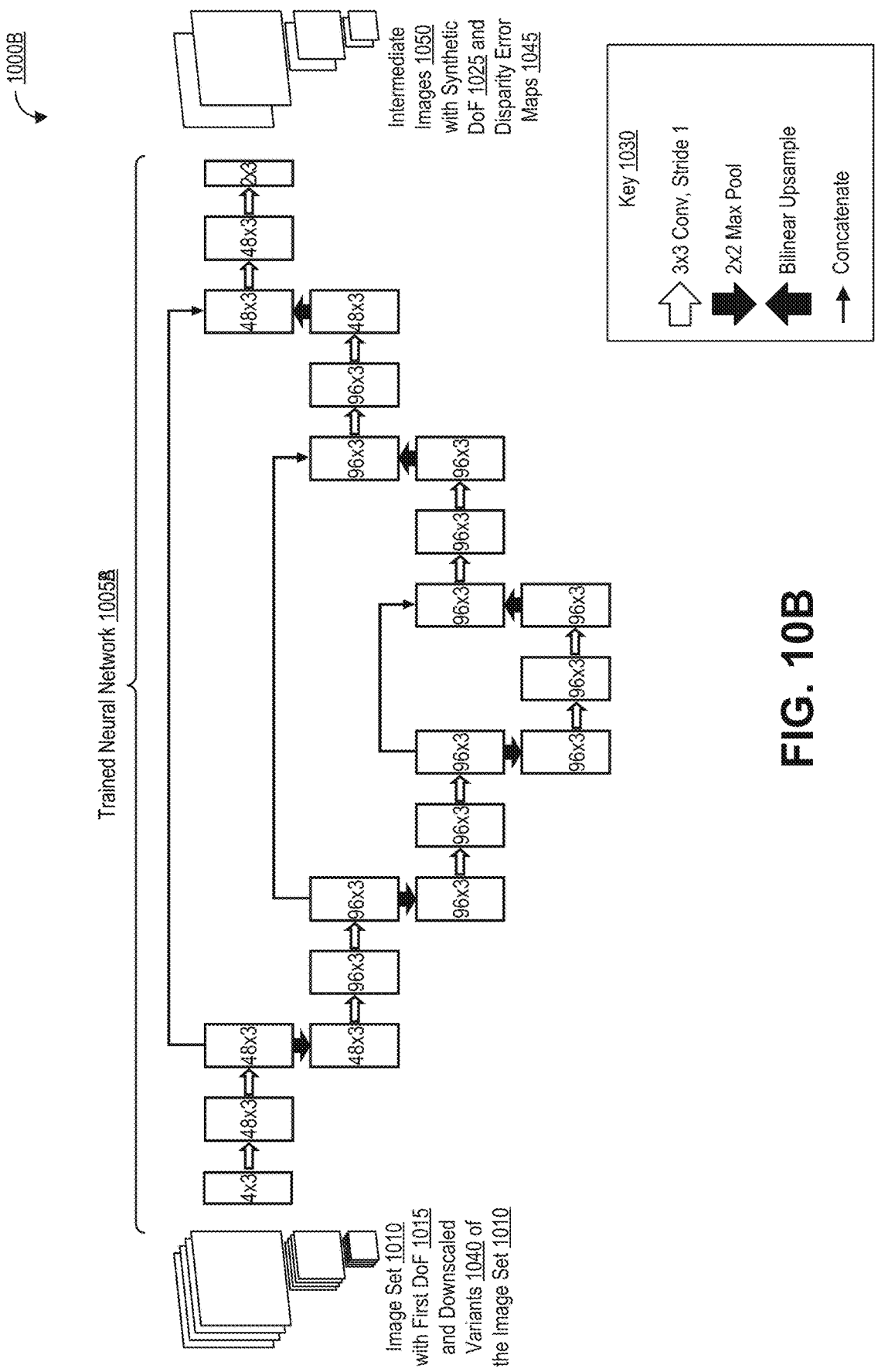
FIG. 10B is a block diagram illustrating an example of a neural network architecture of a trained neural network of the first trained machine learning model that generates intermediate images with a synthetic depth of field and disparity error maps based on an image set at a first depth of field and downscaled variants of the image set, in accordance with some examples.

The imaging system uses the image set 705, the half-size variant of the image set 705 produced by the downscaler 750, and the quarter-size variant of the image set 705 produced by the downscaler 755 as inputs to a first trained machine learning (ML) model 760 of the imaging system. Examples of the first trained ML model 760 are illustrated in FIG. 9 and FIG. 10B. Examples of training data for training the first trained ML model 760 is illustrated in FIGS. 11A-11B.

Figure 10C:
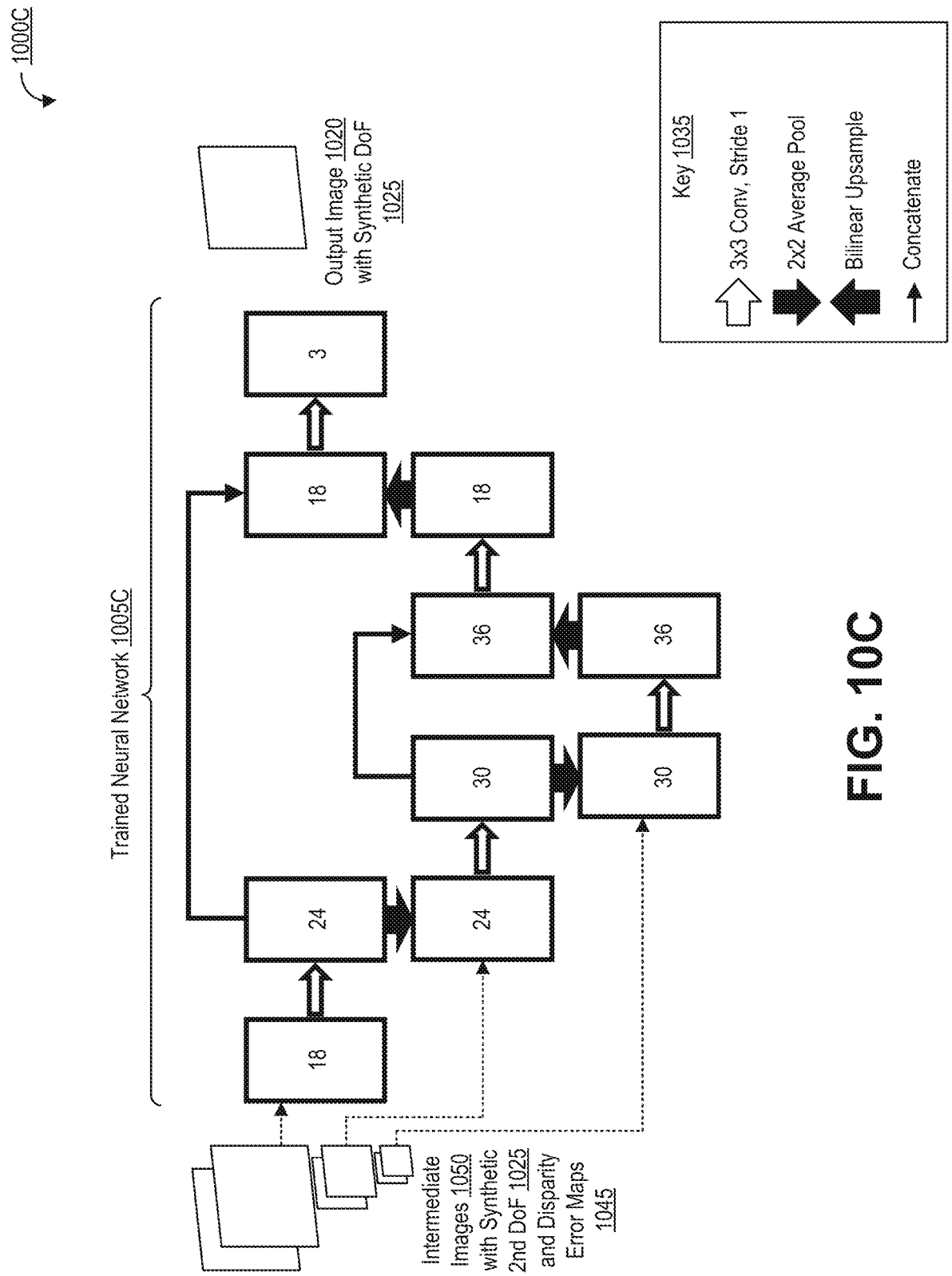
FIG. 10C is a block diagram illustrating an example of a neural network architecture of a trained neural network of the second trained machine learning model that generates an output image with a synthetic depth of field based on intermediate images with a synthetic depth of field and disparity error maps, in accordance with some examples.

The first trained ML model 760 of the imaging system generates intermediate data. The imaging system uses the intermediate data as inputs to a second trained machine learning (ML) model 765 of the imaging system. The second trained ML model generates an output image 770 based on the intermediate data. The intermediate data can include, for example, intermediate images and/or disparity error maps. Examples of intermediate images include the intermediate images 810. Examples of disparity error maps include the disparity error maps 805. Examples of the second trained ML model 765 are illustrated in FIG. 9 and FIG. 10C. Examples of training data for training the second trained ML model 765 includes intermediate data generated based on the training data illustrated in FIGS. 11A-11B.

The output image 770 is an image characterized by a synthetic DoF 740. The synthetic DoF 740 can be shallower than the first DoF 720. The synthetic DoF 740 can simulate a DoF to be produced by a camera photographing the same scene as is depicted in the image set 705, but with a camera having an aperture of the simulated aperture size 735 instead of the first aperture size 715. The simulated aperture size 735 can be larger than the first aperture size 715, for instance as illustrated in FIG. 6, FIG. 7, FIGS. 8A-8B, and with respect to the cameras 530A-530C and simulated apertures 535A-535C of FIGS. 5A-5C. The output image 770 depicts the fire hydrant as clear and in-focus, while depicting the background behind the fire hydrant as blurry and out-of-focus.

In some examples, the first trained ML model 760 and the second trained ML model 765 can be a single trained ML model that performs operations discussed herein as performed by the first trained ML model 760 and operations discussed herein as performed by the second trained ML model 765.

Figure 8A:
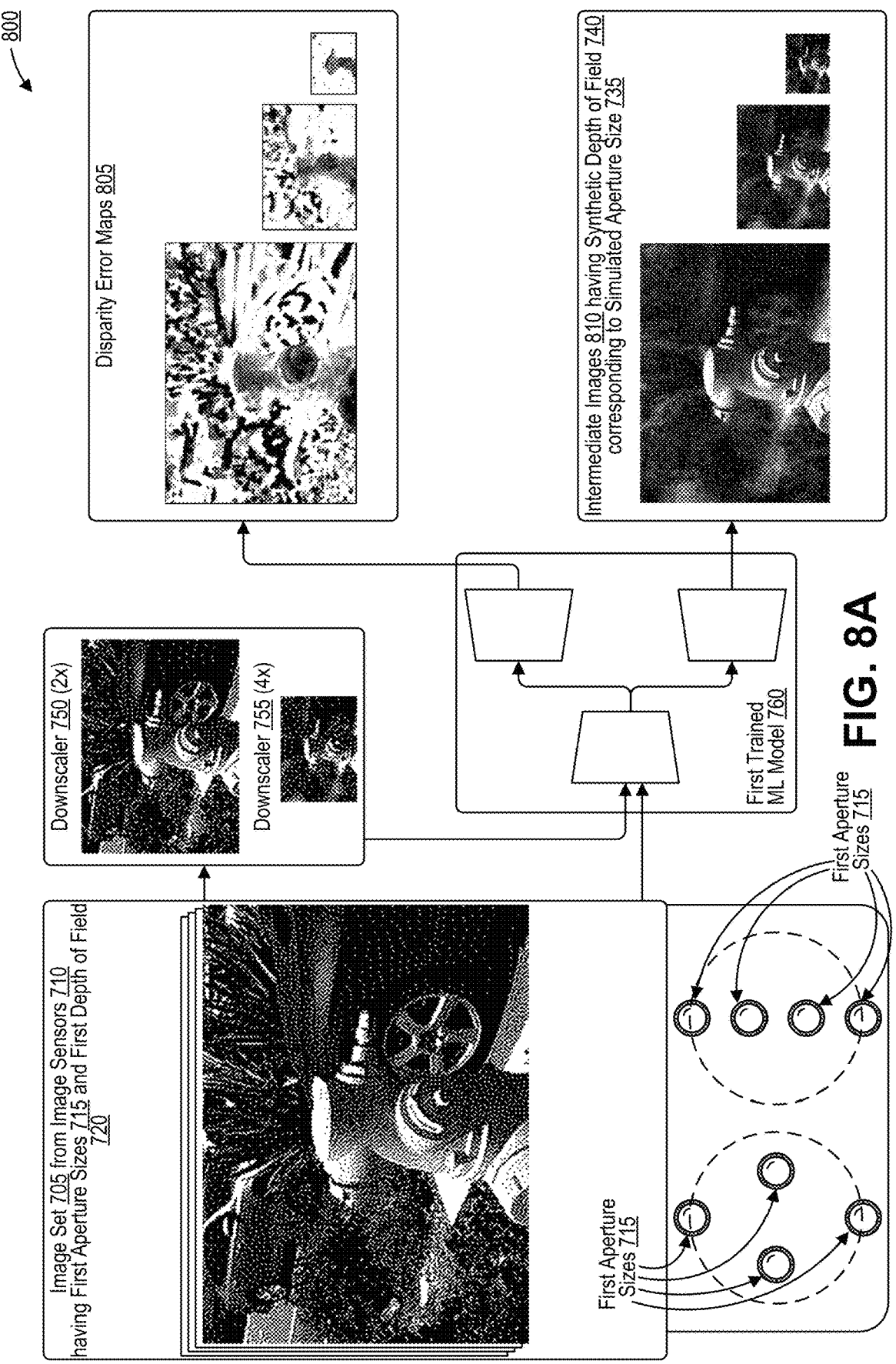
FIG. 8A is a block diagram illustrating generating disparity error maps and intermediate images by using the image set from the multiple image sensors, and the downscaled variants of the image set, as inputs to the first trained machine learning model, in accordance with some examples.

FIG. 8A is a block diagram 800 illustrating generating disparity error maps 805 and intermediate images 810 by using the image set 705 from the multiple image sensors 710, and the downscaled variants of the image set 705, as inputs to the first trained machine learning model 760. As in FIG. 7, the downscaler 750 and the downscaler 755 receive the image set 705 to generate the downscaled variants of the image set 705. Examples of the downscaled variants of individual images in the image set 705 are illustrated in FIG. 8A.

The first trained machine learning model 760 receives the image set 705 and the downscaled variants of the image set 705 as inputs. The first trained ML model 760 of the imaging system generates intermediate data. The intermediate data generated by the first trained ML model 760 includes the intermediate images 810. The intermediate images 810 are images characterized by the synthetic DoF 740 corresponding to the simulated aperture size 735. The intermediate images 810 may include disparity errors in regions associated with disparities between the images in the image set 705. The intermediate data generated by the first trained ML model 760 can include multiple sizes of the intermediate images 810—for instance, a large sized intermediate image generated by the first trained ML model 760 based on the image set 705, a medium sized intermediate image generated by the first trained ML model 760 based on the half-size variant of the image set 705 generated by the downscaler 750, and a small sized intermediate image generated by the first trained ML model 760 based on the quarter-size variant of the image set 705 generated by the downscaler 755. In some examples, the first trained ML model 760 can generate some of the sizes of the intermediate images 810 by downscaling other another size of the intermediate images 810.

The intermediate data generated by the first trained ML model 760 includes disparity error maps 805. The disparity error maps 805 map areas corresponding to disparity error, or lack thereof, in the intermediate images 810 of the corresponding size. The disparity error maps 805 generated by the first trained ML model 760 can include multiple sizes of the disparity error maps 805—for instance, a large sized disparity error map generated by the first trained ML model 760 based on the image set 705, a medium sized disparity error map generated by the first trained ML model 760 based on the half-size variant of the image set 705 generated by the downscaler 750, and a small sized disparity error map generated by the first trained ML model 760 based on the quarter-size variant of the image set 705 generated by the downscaler 755. In some examples, the first trained ML model 760 can generate some of the sizes of the disparity error maps 805 by downscaling other another size of the disparity error maps 805.

Figure 8B:
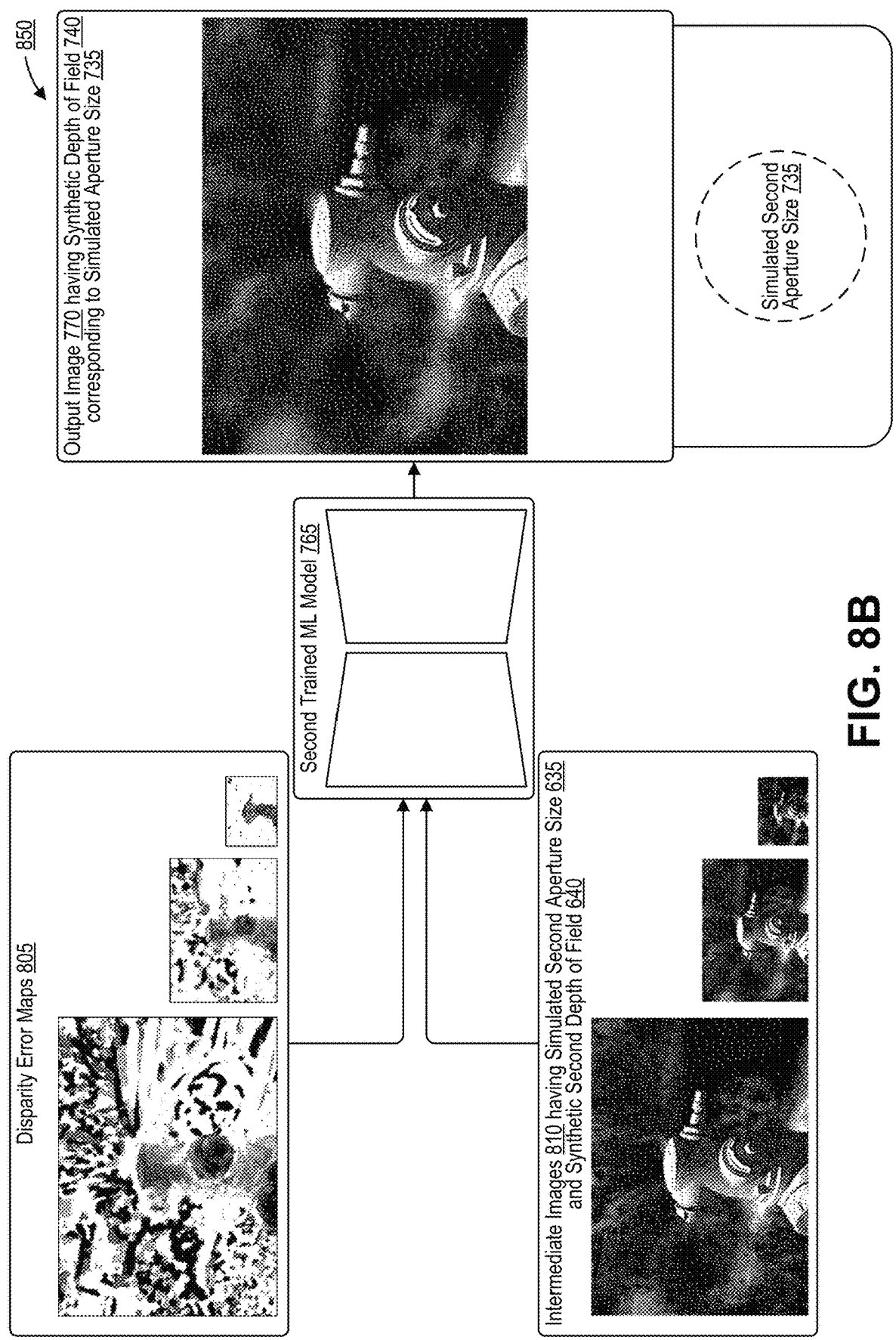
FIG. 8B is a block diagram illustrating using the disparity error maps and the intermediate images as inputs to the second trained machine learning model to generate the output image, in accordance with some examples.

FIG. 8B is a block diagram 850 illustrating using the disparity error maps 805 and the intermediate images 810 as inputs to the second trained machine learning model 765 to generate the output image 770.

Examples of the greyscale versions of the disparity error maps 805 are illustrated in FIGS. 8A-8B. The disparity error maps 805 may be in color. In some examples, brighter shades (e.g., white) represent high positive disparity, darker shades (e.g., black) represent high (in terms of absolute value) negative disparity, and a shade of grey halfway between white and black represents no disparity. These greyscale disparity values can be determined over multiple color channels (e.g., red, green, blue) and/or with high confidence. In some examples, colors (e.g., red, green, blue, yellow, magenta, cyan, etc.) may represent disparity errors—referring to disparities that only exist in certain color channels and that are therefore determined with a low confidence. Many of the regions that appear grey outside of the fire hydrant in the greyscale versions of the disparity error maps 805 that are illustrated in FIGS. 8A-8B actually appear colorful in color versions of the disparity error maps 805, indicating disparities errors with disparities in certain color channels, and/or indicating low confidence in these disparities.

Generally, disparity error is reduced, and/or disparity is determined with higher confidence, at smaller image scales. Thus, the small-sized disparity error map generally shows less disparity error than the large-sized disparity error map. To generate the output image 770, the imaging system (e.g., the second trained ML model 765) combines portions of the three differently sized intermediate images 810 into the output image 770 based on which of the corresponding portions of the disparity error maps 805 is the largest that includes disparity error below a threshold. For example, the medium-sized disparity error map includes a few areas to the right of the fire hydrant that have very little disparity error, but the large-sized disparity error map still includes a significant amount of disparity error in the same areas to the right of the fire hydrant. Thus, the output image 770 can include upscaled portions of the medium-sized intermediate image for these areas to the right of the fire hydrant. Meanwhile, some areas above and to the left of the fire hydrant include very little disparity error in the small-sized disparity error map, but still include a significant amount of disparity error in the same areas above and to the left of the fire hydrant even in the medium-sized disparity error map. Thus, the output image 770 can include upscaled portions of the small-sized intermediate image for these areas above and to the left of the fire hydrant. Finally, the fire hydrant itself generally includes very little disparity error in the large-sized disparity error map, so the output image 770 can include portions of the large-sized intermediate image for most of the fire hydrant itself. The second trained ML model 765 can cleanly combine these portions so that no seams are visible. The use of upscaled portions of the smaller intermediate images for areas with high disparity error can reduce visual artifacts in the output image 770 (compared to the large-sized intermediate image), which can appear as, or similar to, ghosting artifacts or "double vision" in some examples. Because disparity error is generally highest in areas that are intended to be blurry and out of focus, the use of upscaled portions of the smaller intermediate images for areas with high disparity error generally does not produce any problems with respect to the downscaling and upscaling blurring those areas.

The second trained ML model generates the output image 770 based on the intermediate data. As discussed with respect to FIG. 7, the output image 770 is an image characterized by the synthetic DoF 740 corresponding to the simulated aperture size 735. The output image 770 depicts the fire hydrant as clear and in-focus, while depicting the background behind the fire hydrant as blurry and out-of-focus. The fire hydrant appears clear and in-focus in the output image 770, similarly to the large-sized intermediate image. The background behind the fire hydrant appears blurry and out-of-focus in the output image 770, with visual artifacts reduced or eliminated compared to the large-sized intermediate image.

FIG. 9 is a block diagram illustrating an example of a neural network (NN) 900 that can be used by the trained machine learning system that generates images with synthetic depth of field and/or that generates disparity error maps. The images with synthetic depth of field generated by the NN 900 can include, for example, the output image 630, the output image 770, the intermediate images 810, the output image 1020, the intermediate images 1050, the output image 1210, the output image 1310, the output image 1410, the output image 1510, the output image 1515, the image of operation 1620, or a combination thereof. The disparity error maps generated by the NN 900 can include, for example, the disparity error maps 805. The neural network 900 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 900 may be an example of one of the one or more trained neural networks of the trained ML model 625, of the first trained ML model 760, of the second trained ML model 765, of a trained ML model that performs operations of the first trained ML model 760 and the second trained ML model 765, of the trained NN 1005A, of the trained NN 1005B, of the trained NN 1005C, of the one or more trained ML systems of operation 1615, or a combination thereof.

An input layer 910 of the neural network 900 includes input data. The input data of the input layer 910 can include data representing the pixels of one or more input image frames. In an illustrative example, the input data of the input layer 910 can include data representing the pixels of image data (e.g., of the image set 605, of the image set 705, of the disparity error maps 805, of the intermediate images 810, of the image set 1010, of the downscaled variants 1040, of the disparity error maps 1045, and/or of the intermediate images 1050) and/or metadata corresponding to the image data. In one illustrative example, the input data of the input layer 910 can include the image set 605, the image set 705, the image set 1010, the downscaled variants 1040, and/or metadata 270.

In another illustrative example, the input data of the input layer 910 can include the disparity error maps 805, the intermediate images 810, the disparity error maps 1045, the intermediate images 1050, and/or metadata. The images can include image data from an image sensor including raw pixel data (including a single color per pixel based, for example, on a Bayer filter) or processed pixel values (e.g., RGB pixels of an RGB image). The neural network 900 includes multiple hidden layers 912A, 912B, through 912N. The hidden layers 912A, 912B, through 912N include "N" number of hidden layers, where "N" is an integer greater than or equal to one. The number of hidden layers can be made to include as many layers as needed for the given application. The neural network 900 further includes an output layer 914 that provides an output resulting from the processing performed by the hidden layers 912A, 912B, through 912N. In some examples, the output layer 914 can provide an output image, such as the output image 630, the output image 770, the intermediate images 810, the output image 1020, the intermediate images 1050, the output image 1210, the output image 1310, the output image 1410, the output image 1510, the output image 1515, the image of operation 1620, or a combination thereof. In some examples, the output layer 914 can provide intermediate images and/or disparity error maps, such as the disparity error maps 805, the intermediate images 810, the disparity error maps 1045, the intermediate images 1050, or a combination thereof.

The neural network 900 is a multi-layer neural network of interconnected filters. Each filter can be trained to learn a feature representative of the input data. Information associated with the filters is shared among the different layers and each layer retains information as information is processed. In some cases, the neural network 900 can include a feed-forward network, in which case there are no feedback connections where outputs of the network are fed back into itself. In some cases, the network 900 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 910 can activate a set of nodes in the first hidden layer 912A. For example, as shown, each of the input nodes of the input layer 910 can be connected to each of the nodes of the first hidden layer 912A. The nodes of a hidden layer can transform the information of each input node by applying activation functions (e.g., filters) to this information. The information derived from the transformation can then be passed to and can activate the nodes of the next hidden layer 912B, which can perform their own designated functions. Example functions include convolutional functions, downscaling, upscaling, data transformation, and/or any other suitable functions. The output of the hidden layer 912B can then activate nodes of the next hidden layer, and so on. The output of the last hidden layer 912N can activate one or more nodes of the output layer 914, which provides a processed output image. In some cases, while nodes (e.g., node 916) in the neural network 900 are shown as having multiple output lines, a node has a single output and all lines shown as being output from a node represent the same output value.

In some cases, each node or interconnection between nodes can have a weight that is a set of parameters derived from the training of the neural network 900. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 910 using the different hidden layers 912A, 912B, through 912N in order to provide the output through the output layer 914.

FIG. 10A is a block diagram illustrating an example of a neural network architecture 1000A of a trained neural network 1005A of the trained machine learning model 625 that generates an output image 1020 with a synthetic depth of field 1025 based on an image set 1010 at a first depth of field 1015. The synthetic DoF 1025 may be shorter than the first DoF 1015. The synthetic DoF 1025 may correspond to a simulated aperture size, such as the simulated aperture size 635, the simulated aperture size 735, and/or a simulated aperture size of any of the simulated apertures 535A-535C. The first DoF 1015 may correspond to a first aperture size of one or more cameras that capture the image set 1010, such as the first aperture sizes 615, the first aperture sizes 715, and/or the aperture sizes of the cameras 530A-530C. Examples of the image set 1010 include the image set 605, the image set 705, an image set that includes the input image 1205, an image set that includes the input image 1305, an image set that includes the input image 1405, an image set that includes the input image 1505, or a combination thereof. Examples of the output image 1020 include the output image 730, the output image 770, the output image 1210, the output image 1310, the output image 1410, the output image 1510, the output image 1515, the image of operation 1620, or a combination thereof. In an illustrative example, the image set 1010 includes 4 images.

The trained neural network 1005A may be an example of one of the one or more trained neural networks 900 of the trained machine learning model 625. The trained neural network 1005A receives, as its input, the image data from the image set 1010 with the first DoF 1015, and/or metadata related to the image set 1010 and/or the first DoF 1015. The image data from the input image 1005 may include raw image data. The raw image data may correspond to an entire image or an image patch representing a region of an entire image in the image set 1010. The image set 1010 may include demosaicked image data, which may be demosaicked using an ISP 154. The trained neural network 1005A outputs the output image 1020 with the synthetic DoF 1025.

A key 1030 identifies different NN operations performed by the trained NN 1005A to generate the output image 1020 based on the image set 1010 and/or the metadata. For instance, according to the key 1030, convolutions with 3×3 filters and a stride of 1 are indicated by a white arrow outlined in black and pointing to the right. 2×2 maximum pooling (also referred to as max pooling) is indicated by a thick black arrow pointing downward. Upsampling (e.g., bilinear upsampling) is indicated by a thick black arrow pointing upward. Concatenation is illustrated by a thin black line ending in an arrowhead.

The trained NN 1005A includes, and uses, numerous convolutional layers and/or feature maps in the process of generating the output image 1020 with the synthetic DoF 1025 based on the image set 1010 with the first DoF 1015. In an illustrative example, using the convolutional layers and/or feature maps, the trained NN 1005A changes the feature space from 4×3, to 48×3, to 96×3, back to 48×3, and eventually to 1×3. In some examples, the depth of 3 can represent 3 color channels in which the image set 1010 is encoded, such as red, green, and blue (RGB).

In an illustrative example, each image of the image set 1010 is a monochrome image with two colors (e.g., black and white). In another illustrative example, each image of the image set 1010 is a greyscale image with shades of grey between black and white. In some examples, each image of the image set 1010 is a color image. In another illustrative example, each image of the image set 1010 includes a limited set of colors (e.g., 256 colors).

In some examples, each image of the image set 1010 may represent a single color channel of a second image set that is in color. For example, if the images of the second image set are red-green-blue (RGB) color images, the image set 1010 may represent a green color channel of the second image set, a red color channel of the second image set, or a blue color channel of the second image set. If the images of the second image set are cyan-magenta-yellow-black (CMYK) color images, the image set 1010 may represent a cyan color channel of the second image set, a magenta color channel of the second image set, a yellow color channel of the second image set, or a black color channel of the second image set. In such examples, the trained NN 1005A illustrated in FIG. 10A generates an output image 1020 for the color channel represented by the input image. Other image sets corresponding to the other color channels for the second image set can be input to the trained NN 1005A illustrated in FIG. 10A, causing the trained NN 1005A to generate output images for those other color channels. Once the trained NN 1005A has generated output images for all of the color channels for the second image set based on input image sets representing each of the color channels for the second image set, an imaging system that uses the trained NN 1005A can combine the multiple output images corresponding to the different color channels into a single, color, output image that corresponds to the color second image set.

FIG. 10B is a block diagram illustrating an example of a neural network architecture 1000B of a trained neural network 1005B of the first trained machine learning model 760 that generates intermediate images 1050 with a synthetic depth of field 1025 and disparity error maps 1045 based on an image set 1010 at a first depth of field 1015 and downscaled variants 1040 of the image set 1010. Examples of the intermediate images 1050 include the intermediate images 810. Examples of the disparity error maps 1045 include the disparity error maps 805. In an illustrative example, the image set 1010 includes 4 images.

The trained neural network 1005B may be an example of one of the one or more trained neural networks 900 of the first trained machine learning model 760. The trained neural network 1005B receives, as its input, the image data from the image set 1010 with the first DoF 1015, and downscaled variants 1040 of the image set 1010, and/or metadata related to the image set 1010 and/or the first DoF 1015 and/or the downscaler(s) (e.g., downscaler 750 and/or downscaler 755). The image data from the input image 1005 may include raw image data. The raw image data may correspond to an entire image or an image patch representing a region of an entire image in the image set 1010. The image set 1010 may include demosaicked image data, which may be demosaicked using an ISP 154. The trained neural network 1005B outputs the intermediate images 1050 with the synthetic DoF 1025 and/or the disparity error maps 1045. The key 1030 of FIG. 10A is also illustrated in FIG. 10B, indicating, for example, the 3×3 convolutions, the 2×2 maximum pooling operations, the bilinear upsampling operations, and concatenation operations.

The trained NN 1005B includes, and uses, numerous convolutional layers and/or feature maps in the process of generating one or more intermediate images 1050 with the synthetic DoF 1025 and one or more disparity error maps 1045 based on the image set 1010 with the first DoF 1015. In an illustrative example, the trained NN 1005B generates one intermediate image 1050 with the synthetic DoF 1025 and one disparity error map 1045 based on the image set 1010 with the first DoF 1015. In an illustrative example, using the convolutional layers and/or feature maps, the trained NN 1005B changes the feature space from 4×3, to 48×3, to 96×3, back to 48×3, and eventually to 2×3. In some examples, the depth of 3 can represent 3 color channels in which the image set 1010 is encoded, such as red, green, and blue (RGB).

In an illustrative example, each image of the image set 1010 is a monochrome image with two colors (e.g., black and white). In another illustrative example, each image of the image set 1010 is a greyscale image with shades of grey between black and white. In some examples, each image of the image set 1010 is a color image. In another illustrative example, each image of the image set 1010 includes a limited set of colors (e.g., 256 colors).

In some examples, each image of the image set 1010 may represent a single color channel of a second image set that is in color. For example, if the images of the second image set are red-green-blue (RGB) color images, the image set 1010 may represent a green color channel of the second image set, a red color channel of the second image set, or a blue color channel of the second image set. If the images of the second image set are cyan-magenta-yellow-black (CMYK) color images, the image set 1010 may represent a cyan color channel of the second image set, a magenta color channel of the second image set, a yellow color channel of the second image set, or a black color channel of the second image set. In such examples, the trained NN 1005B illustrated in FIG. 10B generates one or more intermediate images 1050 with the synthetic DoF 1025 and one or more disparity error maps 1045 for the color channel represented by the input image. Other image sets corresponding to the other color channels for the second image set can be input to the trained NN 1005B illustrated in FIG. 10B, causing the trained NN 1005B to generate one or more intermediate images 1050 with the synthetic DoF 1025 and one or more disparity error maps for those other color channels. Once the trained NN 1005B has generated one or more intermediate images with the synthetic DoF 1025 and one or more disparity error maps for all of the color channels for the second image set based on input image sets representing each of the color channels for the second image set, an imaging system that uses the trained NN 1005B can combine the multiple intermediate images with the synthetic DoF and one or more disparity error maps corresponding to the different color channels into a single, color, intermediate image with the synthetic DoF 1025 and a single, color, disparity error map.

FIG. 10C is a block diagram illustrating an example of a neural network architecture 1000C of a trained neural network 1005C of the second trained machine learning model 765 that generates an output image 1020 with a synthetic depth of field 1025 based on intermediate images 1050 with a synthetic depth of field 1025 and disparity error maps 1045. The trained neural network 1005C may be an example of one of the one or more trained neural networks 900 of the second trained machine learning model 765. The trained neural network 1005A receives, as its input, the intermediate images 1050 with the synthetic DoF 1025, the disparity error maps 1045, and/or metadata associated with the intermediate images 1050 and/or the disparity error maps 1045. The trained neural network 1005A may receive, as inputs, the one or more intermediate images 1050 and the one or more disparity error maps 1045 resized and/or resampled to multiple different sizes, such as a large size (e.g., original size), a medium size (e.g., half of original size), and a small size (e.g., quarter of original size). The trained neural network 1005A outputs the output image 1020 with the synthetic DoF 1025.

A key 1035 is illustrated in FIG. 10C. The key 1035 identifies different NN operations performed by the trained NN 1005C to generate the output image 1020 with the synthetic DoF 1025 based on the one or more intermediate images 1050 and the one or more disparity error maps 1045. The key 1035 is similar to the key 1030 of FIGS. 10A-10B. For instance, according to the key 1035, convolutions with 3×3 filters and a stride of 1 are indicated by a white arrow outlined in black and pointing to the right, as in the key 1030. 2×2 average pooling is indicated by a thick black arrow pointing downward. In some examples, 2×2 max pooling may be used in place of the 2×2 average pooling, as in the key 1030. Upsampling (e.g., bilinear upsampling) is indicated by a thick black arrow pointing upward, as in the key 1030. Concatenation is illustrated by a thin black line ending in an arrowhead, as in the key 1030. In some examples, the different sizes of the one or more intermediate images 1050 and the one or more disparity error maps 1045 can be provided to the trained NN 1005C after one or more convolutions of the trained NN 1005C, for instance following the two 2×2 average pool operations as indicated by the dashed arrows in FIG. 10C.

The trained NN 1005C includes, and uses, numerous convolutional layers and/or feature maps in the process of generating the output image 1020 with the synthetic DoF 1025 based on the one or more intermediate images 1050 and the one or more disparity error maps 1045. In an illustrative example, using the convolutional layers and/or feature maps, the trained NN 1005C changes the feature space from 18, to 24, to 30, to 36, back to 18, and on to 3. In another illustrative example, using the convolutional layers and/or feature maps, the trained NN 1005C changes the feature space from 6, to 12, to 24, to 36, to 18, and on to 3. In some examples, the 3 of the output layers can represent 3 color channels in which the output image 1020 is encoded, such as red, green, and blue (RGB).

In an illustrative example, each image of the one or more intermediate images 1050 and/or the one or more disparity error maps 1045 is a monochrome image with two colors (e.g., black and white). In another illustrative example, each image of the one or more intermediate images 1050 and/or the one or more disparity error maps 1045 is a greyscale image with shades of grey between black and white. In some examples, each image of the one or more intermediate images 1050 and/or the one or more disparity error maps 1045 is a color image. In another illustrative example, each image of the one or more intermediate images 1050 and/or the one or more disparity error maps 1045 includes a limited set of colors (e.g., 256 colors).

In some examples, each image of the one or more intermediate images 1050 and/or the one or more disparity error maps 1045 may represent a single color channel of a second set of one or more intermediate images and/or one or more disparity error maps that are in color. For example, if the images of the second set of one or more intermediate images and/or one or more disparity error maps are red-green-blue (RGB) color images, the one or more intermediate images 1050 and/or the one or more disparity error maps 1045 may represent a green color channel, red color channel, or blue color channel of the second set of one or more intermediate images and/or one or more disparity error maps. If the images of the second set of one or more intermediate images and/or one or more disparity error maps are cyan-magenta-yellow-black (CMYK) color images, the one or more intermediate images 1050 and/or the one or more disparity error maps 1045 may represent a cyan color channel, a magenta color channel, a yellow color channel, or a black channel of one or more intermediate images 1050 and/or one or more disparity error maps 1045. In such examples, the trained NN 1005C illustrated in FIG. 10C generates an output image 1020 for the color channel represented by the one or more intermediate images 1050 and/or the one or more disparity error maps 1045. Other sets of the one or more intermediate images and/or one or more disparity error maps corresponding to the other color channels for the second set of one or more intermediate images and/or one or more disparity error maps can be input to the trained NN 1005C illustrated in FIG. 10C, causing the trained NN 1005C to generate output images for those other color channels. Once the trained NN 1005C has generated output images for all of the color channels for the second set of one or more intermediate images and/or one or more disparity error maps based on inputs of sets of one or more intermediate images and/or one or more disparity error maps representing each of the color channels for the second set of one or more intermediate images and/or one or more disparity error maps, an imaging system that uses the trained NN 1005C can combine the multiple output images corresponding to the different color channels into a single, color, output image that corresponds to the color second set of one or more intermediate images and/or one or more disparity error maps.

FIG. 11A is a conceptual diagram 1100 illustrating an example of selected cameras from a camera array 1105 of a light field camera 1140 that may be used to provide training data 1110 to train the one or more trained machine learning models 1115 to process image data from image sensors arranged in a diamond pattern 540. The selected cameras in the camera array are circled with a thick black line, and are arranged in the diamond pattern 540 within the camera array 1105 of the light field camera 1140. The training data 1110 can include an image set with image data of a scene from each of the selected cameras from the camera array 1105, as well as the final output image of the scene generated by the light field camera 1140 based on the images captured by the cameras of the camera array 1105. The ML model(s) 1115 can include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. The image sensors can include, for example, the image sensors 430A-430D, the image sensors of the cameras 530A, the image sensors 610, the image sensors 710, one or more of the image sensor 130, or a combination thereof.

FIG. 11B is a conceptual diagram 1150 illustrating an example of selected cameras from a camera array 1105 of a light field camera 1140 that may be used to provide training data 1120 to train the one or more trained machine learning models 1115 to process image data from image sensors arranged in an inline pattern 545. The selected cameras in the camera array are circled with a thick black line, and are arranged in the diamond pattern 540 within the camera array 1105 of the light field camera 1140. The training data 1110 can include an image set with image data of a scene from each of the selected cameras from the camera array 1105, as well as the final output image of the scene generated by the light field camera 1140 based on the images captured by the cameras of the camera array 1105. The ML model(s) 1115 can include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. The image sensors can include, for example, the image sensors 430A-430D, the image sensors of the cameras 530B, the image sensors of the cameras 530C, the image sensors 610, the image sensors 710, one or more of the image sensor 130, or a combination thereof.

Figure 12:
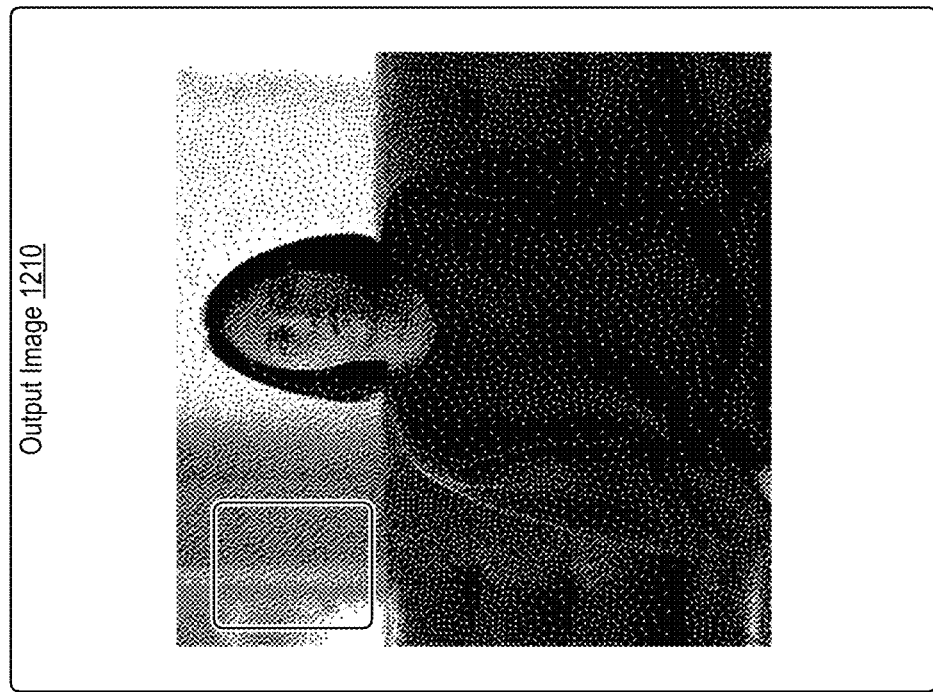
FIG. 12 is a conceptual diagram illustrating an input image of a portrait and an output image of the portrait that has a synthetic depth of field and is generated using one or more trained machine learning models, in accordance with some examples.
Figure 12:

FIG. 12 is a conceptual diagram 1200 illustrating an input image 1205 of a portrait and an output image 1210 of the portrait that has a synthetic depth of field and is generated using one or more trained machine learning models. The one or more trained ML models may include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. An area of the background of the scene in which changes between the input image 1205 and the output image 1210 are prominently visible is highlighted in both the input image 1205 and the output image 1210 with a rounded rectangle overlaid over both the input image 1205 and the output image 1210. In particular, the background appears more blurry and out-of-focus in the output image 1210, putting the focus on the woman in the portrait. The transitions between the clear and in-focus woman and the blurry and out-of-focus are clean, even around the boundaries of the woman, and even at complex boundaries such as the woman's hair.

Figure 13:
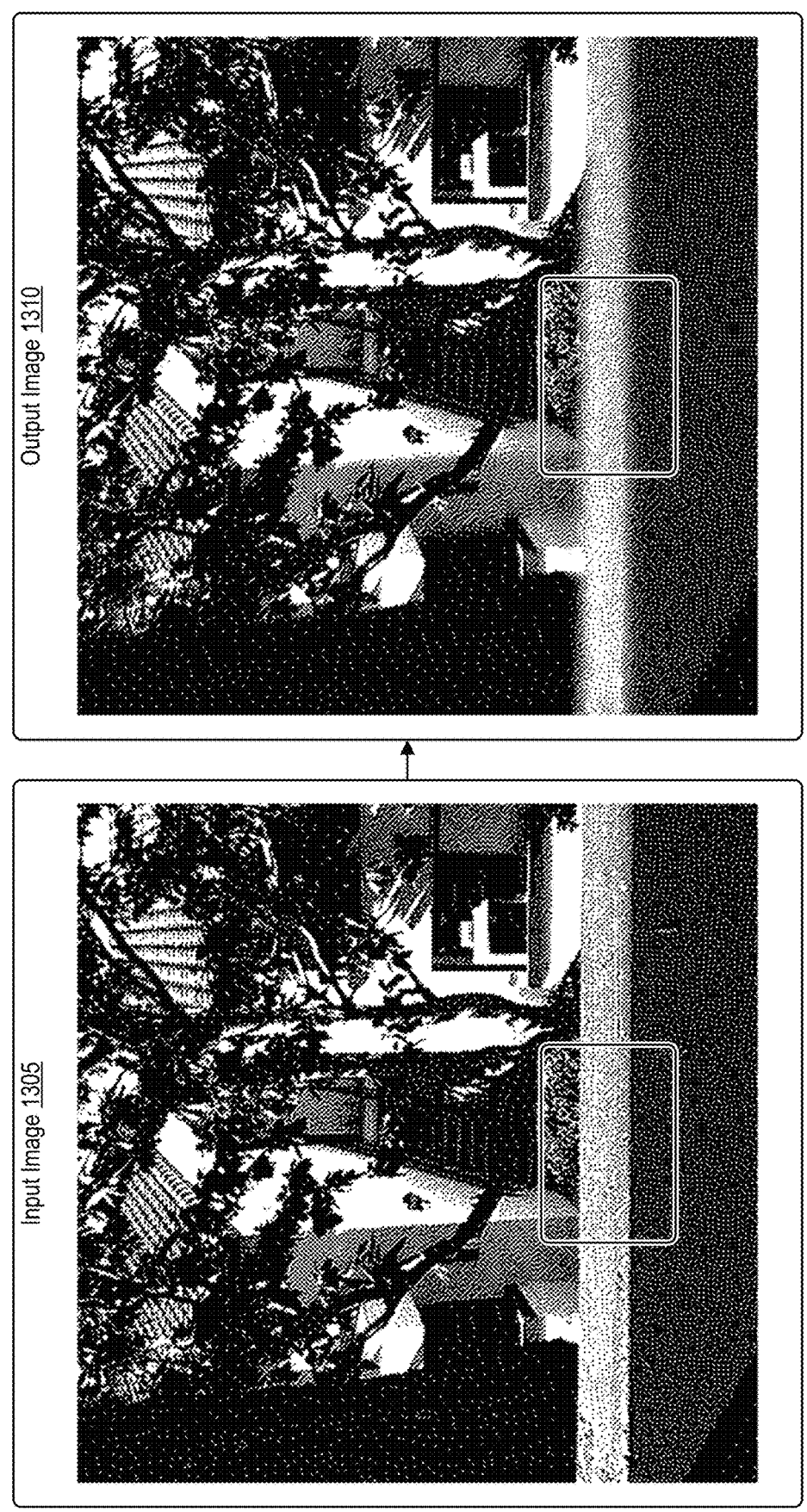
FIG. 13 is a conceptual diagram illustrating a input image of a neighborhood scene and an output image of the neighborhood scene that has a synthetic depth of field and is generated using one or more trained machine learning models, in accordance with some examples.

FIG. 13 is a conceptual diagram 1300 illustrating a input image 1305 of a neighborhood scene and an output image 1310 of the neighborhood scene that has a synthetic depth of field and is generated using one or more trained machine learning models. The one or more trained ML models may include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. An area of the foreground of the scene in which changes between the input image 1305 and the output image 1310 are prominently visible is highlighted in both the input image 1305 and the output image 1310 with a rounded rectangle overlaid over both the input image 1305 and the output image 1310. In particular, the wall in the foreground appears more blurry and out-of-focus in the output image 1310, putting the focus on the neighborhood in the background behind the wall.

Figure 14:
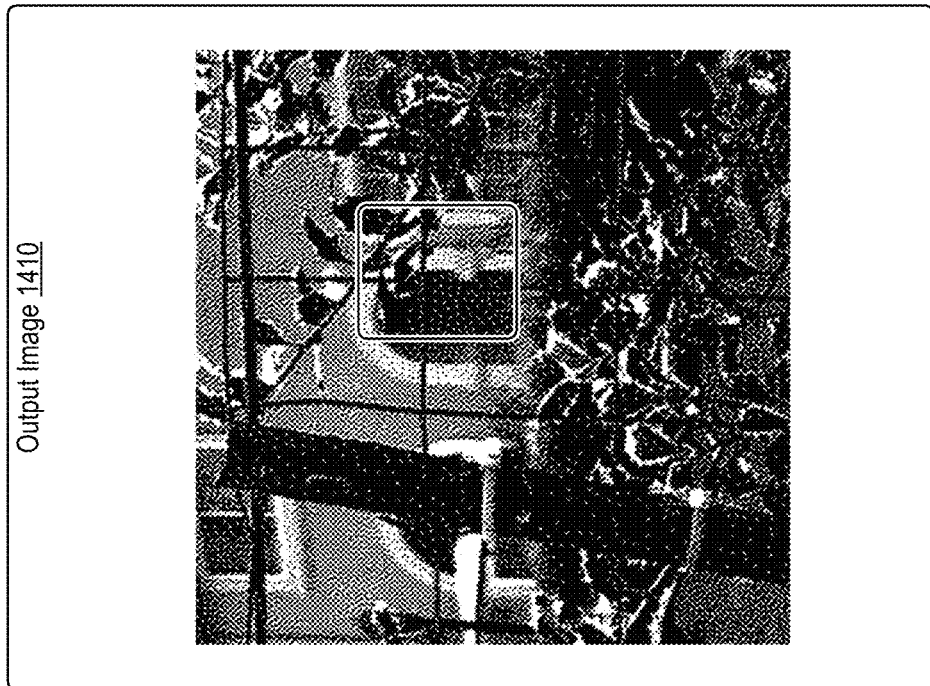
FIG. 14 is a conceptual diagram illustrating an input image of a fence-occluded scene and an output image of the fence-occluded scene that has a synthetic depth of field and is generated using one or more trained machine learning models, in accordance with some examples.
Figure 14:
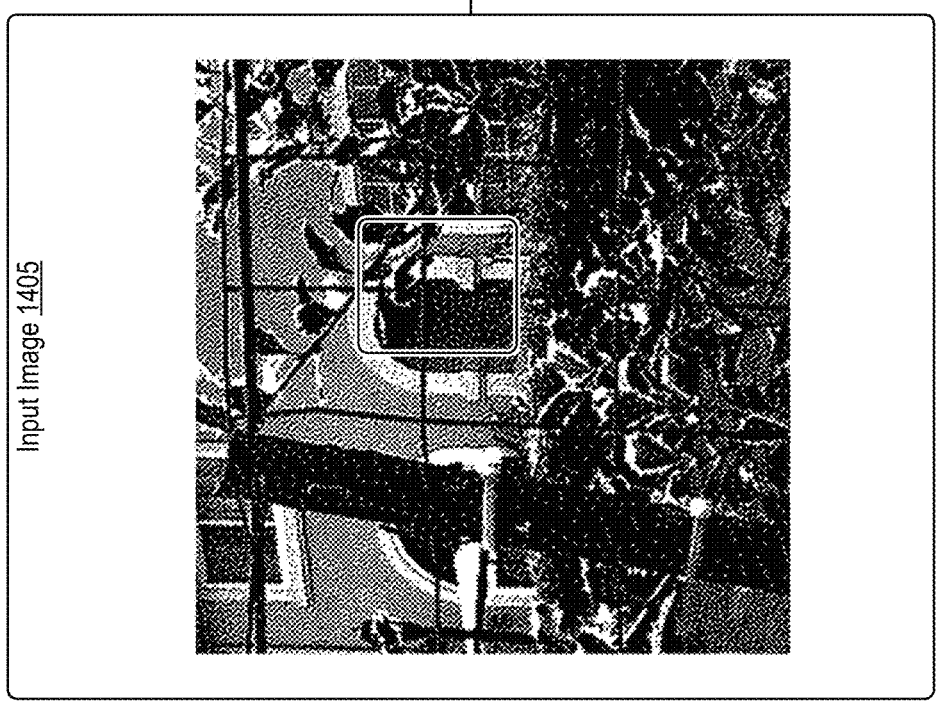

FIG. 14 is a conceptual diagram 1400 illustrating an input image 1450 of a fence-occluded scene and an output image 1410 of the fence-occluded scene that has a synthetic depth of field and is generated using one or more trained machine learning models. The one or more trained ML models may include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. An area of the scene in which changes between the input image 1405 and the output image 1410 are prominently visible is highlighted in both the input image 1405 and the output image 1410 with a rounded rectangle overlaid over both the input image 1405 and the output image 1410. In particular, the building in the background appears more blurry and out-of-focus in the output image 1410, putting the focus on the fence and the plant in the foreground in front of (and occluding) the building.

Figure 15:
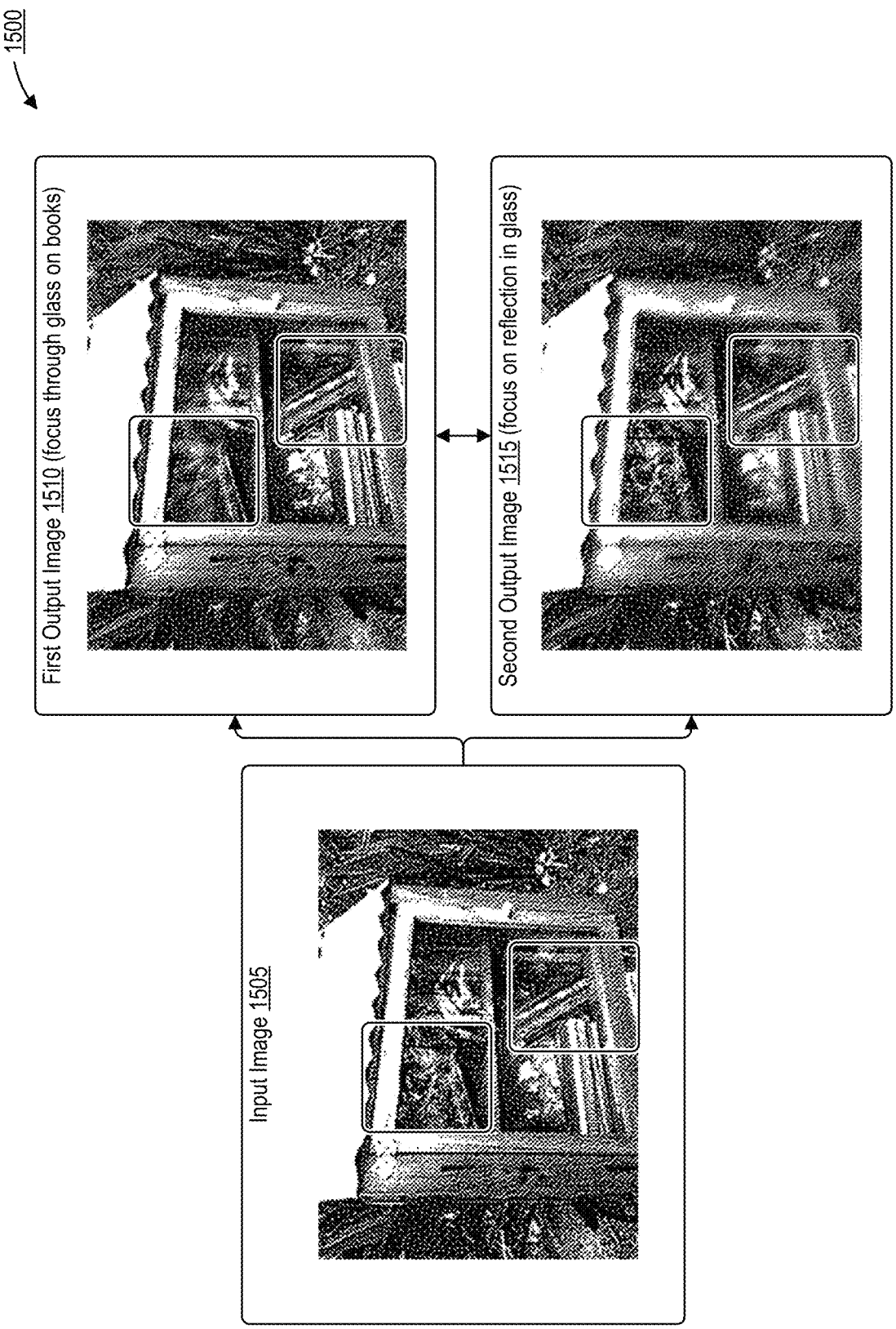
FIG. 15 is a conceptual diagram illustrating an input image of books behind a glass pane and two output images of the books behind the glass pane that have a synthetic depth of field, focus on different elements of the scene, and are generated using one or more trained machine learning models, in accordance with some examples.

FIG. 15 is a conceptual diagram 1500 illustrating an input image 1505 of books behind a glass pane and two output images (first output image 1510 and second output image 1515) of the books behind the glass pane that have a synthetic depth of field, focus on different elements of the scene, and are generated using one or more trained machine learning models. The one or more trained ML models may include, for example, the trained ML model 625, the first trained ML model 760, the second trained ML model 765, the NN 900, the trained NN 1005A, the trained NN 1005B, the trained NN 1005C, the one or more trained ML systems of operation 1615, or a combination thereof. An area of the scene in which changes between the input image 1505 and at least one of the first output image 1510 or the second output image 1515 are prominently visible is highlighted in the input image 1505, the first output image 1510, and the second output image 1515 with a rounded rectangle overlaid over both the input image 1505, the first output image 1510, and the second output image 1515. In particular, in the first output image 1510, the focus is through the glass on the books, the books appearing clear and in-focus, with the reflection on the glass (toward the top of the image) appearing more blurry and out-of-focus. In the second output image 1515, the focus is on the reflection in the glass (toward the top of the image), the reflection appearing clear and in-focus, with the books themselves (through the glass) appearing more blurry and out-of-focus.

Figure 16:
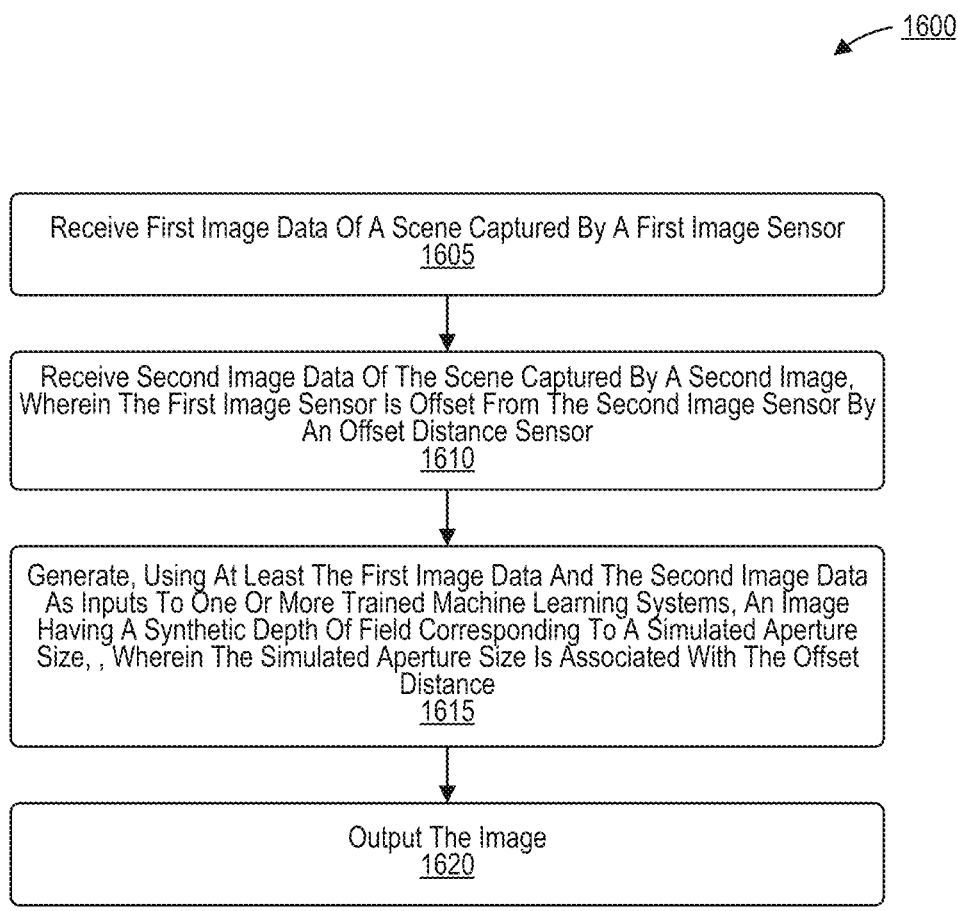
FIG. 16 is a flow diagram illustrating a process for processing image data, in accordance with some examples.

FIG. 16 is a flow diagram illustrating a process 1600 for processing image data. The process 1600 may be performed by an imaging system. In some examples, the imaging system can include, for example, the image capture and processing system 100, the image capture device 105A, the image processing device 105B, the image processor 150, the ISP 154, the host processor 152, the image capture and processing system 400, the image capture device 405A, the image processing device 405B, the image processor(s) 450, the trained ML model 625, the first trained ML model 760, the second trained ML model 765, the NN 900, the trained NN 1005A, the trained NN 1005B, the trained NN 1005C, the computing system 1700, the processor 1710, or a combination thereof.

At operation 1605, the imaging system is configured to, and can, receive first image data of a scene captured by a first image sensor. At operation 1610, the imaging system is configured to, and can, receive second image data of the scene captured by a second image sensor. The first image sensor is offset from the second image sensor by an offset distance.

In some examples, the imaging system can include the first image sensor and/or the second image sensor. In some examples, the imaging system can include a first camera that includes the first image sensor and/or a second camera that includes the second image sensor. In some examples, the imaging system can include a camera module that includes the first camera and/or the second camera. In some examples, the imaging system can include a camera module that includes the first image sensor and/or the second image sensor. In some examples, the camera module can include one or more additional cameras in addition to the first camera and/or the second camera. In some examples, the camera module can include one or more additional image sensors in addition to the first image sensor and/or the second image sensor.

Examples of the camera module include the image capture and processing system 400, the image capture device 405A, the image processing device 405B, the camera modules 525A-525C, the input device 1745, another camera module described herein, or a combination thereof. Examples of the first camera and/or the second camera and/or the one or more additional cameras include the image capture and processing system 100, the image capture device 105A, the image processing device 105B, a camera that includes the lens 415A and the control mechanisms 420A and the image sensor 430A, a camera that includes the lens 415B and the control mechanisms 420B and the image sensor 430B, a camera that includes the lens 415C and the control mechanisms 420C and the image sensor 430C, a camera that includes the lens 415D and the control mechanisms 420D and the image sensor 430D, the cameras 530A-530C, the cameras with the image sensors 610 and the first aperture sizes 615, the cameras with the image sensors 710 and the first aperture sizes 715, camera(s) that capture the image set 1010, the input device 1745, another camera described herein, or a combination thereof. Examples of the first image sensor and/or the second image sensor and/or the one or more additional image sensors include the image sensor 130, the image sensors 430A-430D, the image sensors of the cameras 530A-530C, the image sensors 610, the image sensors 710, image sensor(s) that capture the image set 1010, the input device 1745, another image sensor described herein, or a combination thereof.

In some examples, the imaging system may include one or more image sensor connectors that couple one or more processors of the imaging system to the first image sensor, the second image sensor, another image sensor, the first camera, the second camera, another camera, the camera module, or a combination thereof. In some examples, receiving the first image data captured by the first image sensor in operation 1605 includes receiving the first image data from, over, and/or via the one or more image sensor connectors. In some examples, receiving the second image data captured by the second image sensor in operation 1610 includes receiving the first image data from, over, and/or via the one or more image sensor connectors. In some examples, receiving additional image data captured by an additional image sensor of the camera module (other than the first image sensor and the second image sensor) includes receiving the additional image data from, over, and/or via the one or more image sensor connectors. The one or more image sensor connectors can include a port, a jack, a wire, an input/output (I/O) pin, a conductive trace on a printed circuit board (PCB), any other type of connector discussed herein, or some combination thereof. The one or more image sensor connectors can be referred to as connectors, as imaging circuitry, as image sensor circuitry, as connector circuitry, as coupling circuitry, as circuitry, as one or more wires, as one or more transceivers, as one or more receivers, as one or more transmitters, as one or more pins, or a combination thereof.

In some examples, the first image sensor being offset from the second image sensor by the offset distance includes a first optical axis of, or associated with, the first image sensor being offset from a second optical axis of, or associated with, the second image sensor. In some examples, the first image sensor being offset from the second image sensor by the offset distance refers to the offset distance being a distance between an edge or periphery of the first image sensor and an edge or periphery of the second image sensor. In some examples, the first image sensor being offset from the second image sensor by the offset distance includes the offset distance being a minimum distance between the first image sensor and the second image sensor. In some examples, the first image sensor being offset from the second image sensor by the offset distance includes the offset distance being a maximum distance between the first image sensor and the second image sensor.

Examples of the offset distance include the offset distance 537A, the offset distance 537B, another offset distance between another pair of the cameras 530A, the offset distance 547A, another offset distance between another pair of the cameras 530B, the offset distance 547B, another offset distance between another pair of the cameras 530C, offset distances similar to those of FIGS. 5A-5C but for the cameras with the image sensors 610, offset distances similar to those of FIGS. 5A-5C but for the cameras with the image sensors 710, or combinations thereof.

Examples of the first image data of the scene and/or the second image data of the scene include an image captured by the image capture and processing system 100, the input image 205A, the input image 205B, the input image 305, an image captured by the image capture and processing system 400, an image captured by one or more of the cameras 530A-530C, at least one image from the image set 605, at least one image from the image set 605, at least one image from the image set 705, at least one image downscaled by the downscaler 750, at least one image downscaled by the downscaler 755, at least one image from the image set 1010 with the first DoF 1015, at least one image from the downscaled variants 1040 of the image set 1010, the input image 1205, the input image 1305, the input image 1405, the input image 1505, another input image, or a combination thereof.

At operation 1615, the imaging system is configured to, and can, generate, using at least the first image data and the second image data as inputs to one or more trained machine learning systems, an image having a synthetic depth of field corresponding to a simulated aperture size. The simulated aperture size is associated with the offset distance. The one or more trained ML systems can include one or more trained ML models, one or more trained neural networks (NNs), one or more trained convolutional neural networks (CNNs), one or more trained time delay neural networks (TDNNs), one or more deep networks, one or more deep belief nets (DBNs), one or more recurrent neural networks (RNNs), one or more generative adversarial networks (GANs), one or more trained support vector machines (SVMs), one or more trained random forests (RFs), or a combination thereof. Examples of the one or more trained machine learning systems include the trained ML model 625, the first trained ML model 760, the second trained ML model 765, the NN 900, the trained NN 1005A, the trained NN 1005B, the trained NN 1005C, or a combination thereof. The generation of the output image having the synthetic depth of field in operation 1615 can be referred to as generation of a synthetic depth of field effect. The generation of the output image having the synthetic depth of field in operation 1615 can be referred to application of a synthetic depth of field effect to the first image data and/or to the second image data.

Examples of the image having the synthetic depth of field corresponding to the simulated aperture size include the output image 630 having the synthetic depth of field 640 corresponding to the simulated aperture size 635, the output image 770 having the synthetic depth of field 740 corresponding to the simulated aperture size 735, the intermediate images 810 having the synthetic depth of field 740 corresponding to the simulated aperture size 735, the output image 1020 with the synthetic DoF 1025, the intermediate images 1050 with the synthetic DoF 1025, the output image 1210, the output image 1310, the output image 1410, the first output image 1510, the second output image 1515, another output image, or a combination thereof. Examples of the synthetic depth of field include the synthetic DoF 640, the synthetic DoF 740, the synthetic DoF 1025, the synthetic DoF of the output image 1210, the synthetic DoF of the output image 1310, the synthetic DoF of the output image 1410, the synthetic DoF of the first output image 1510, the synthetic DoF of the second output image 1515, or a combination thereof. Examples of the simulated aperture size include the simulated aperture sizes 535A-535C, the simulated aperture size 635, the simulated aperture size 735, a simulated aperture size corresponding to the synthetic DoF 1025, a simulated aperture size corresponding to the output image 1210, a simulated aperture size corresponding to the output image 1310, a simulated aperture size corresponding to the output image 1410, a simulated aperture size corresponding to the first output image 1510, a simulated aperture size corresponding to the second output image 1515, or a combination thereof.

In some examples, the simulated aperture size of operation 1615 refers to a diameter of a simulated aperture corresponding to the synthetic depth of field. For instance, the simulated aperture size may refer to a diameter of one of the simulated aperture sizes 535A-535C as illustrated, a diameter of the simulated aperture size 635 as illustrated, a diameter of the simulated aperture size 735 as illustrated, or a combination thereof. In some examples, the simulated aperture size of operation 1615 refers to an area of a simulated aperture corresponding to the synthetic depth of field. For instance, the simulated aperture size may refer to an area of one of the simulated aperture sizes 535A-535C as illustrated, an area of the simulated aperture size 635 as illustrated, an area of the simulated aperture size 735 as illustrated, or a combination thereof.

In some examples, the simulated aperture size is based on the offset distance. In some examples, the simulated aperture size is equal to the offset distance. For instance, if the simulated aperture size simulated aperture size refers to a diameter of a simulated aperture corresponding to the synthetic depth of field, the diameter can be equal to the offset distance. For example, in FIG. 5A, the offset distance 537A between the top-most camera and the bottom-most camera of the cameras 530A can be equal to the diameter of the simulated aperture 535A, or approximately equal to the diameter of the simulated aperture 535A (e.g., within a threshold distance). Similarly, in FIG. 5B, the offset distance 547A between the top-most camera and the bottom-most camera of the cameras 530B can be equal to the diameter of the simulated aperture 535B, or approximately equal to the diameter of the simulated aperture 535B (e.g., within a threshold distance). Similarly, in FIG. 5C, the offset distance 547B between the left-most camera and the right-most camera of the cameras 530C can be equal to the diameter of the simulated aperture 535C, or approximately equal to the diameter of the simulated aperture 535C (e.g., within a threshold distance).

In some examples, the simulated aperture size is a function of the offset distance. For instance, if the simulated aperture size simulated aperture size refers to an area of a simulated aperture corresponding to the synthetic depth of field, the area can be a function of the offset distance. For example, in FIG. 5A, the offset distance 537A can represent the diameter of the simulated aperture 535A, and the area of the simulated aperture 535A can be a function of the diameter. For instance, if the simulated aperture 535A is circular, the area of the simulated aperture 535A can be equal to the product of $$\frac{\pi}{4}$$

and the square of the diameter. Thus, the area of the simulated aperture 535A can be a function of the offset distance 537A. For instance, the area of the simulated aperture 535A can be equal to the product of $$\frac{\pi}{4}$$

and the square of the offset distance 537A. Similarly, the area of the simulated aperture 535B can be equal to the product $$\frac{\pi}{4}$$

and the square of the offset distance 547A. Similarly, the area of the simulated aperture 535C can be equal to the product of $$\frac{\pi}{4}$$

and the square of the offset distance 547B.

If the simulated aperture size simulated aperture size refers to a diameter of a simulated aperture corresponding to the synthetic depth of field, the diameter can be a function of the offset distance. For instance, in some examples, the offset distance may be equal in length to a radius of the simulated aperture. For example, the offset distance 537B of FIG. 5A is approximately equal in length to a radius of the simulated aperture 535A. In some examples, the diameter of the simulated aperture may be equal to the offset distance multiplied by a multiplier, the offset distance plus a secondary value, the offset distance minus a secondary value, the offset distance divided by a secondary value, or a combination thereof.

In some examples, the synthetic depth of field is shallower than a first depth of field corresponding to the first image sensor and/or than a second depth of field corresponding to the second image sensor. In some examples, the synthetic depth of field is deeper than a first depth of field corresponding to the first image sensor and/or than a second depth of field corresponding to the second image sensor. Examples of the first depth of field and/or the second depth of field include the first depth of field 620 of the image set 605, the first depth of field 720 of the image set 705, the first depth of field 1015 of the image set 1010 (and/or the downscaled variants 1040 of the image set 1010), the depth of field of the input image 1205, the depth of field of the input image 1305, the depth of field of the input image 1405, the depth of field of the input image 1505, or a combination thereof. In some examples, the first depth of field of the first image sensor is equal to the second depth of field corresponding to the second image sensor. In some examples, the first depth of field of the first image sensor is distinct from (e.g., larger than or smaller than) the second depth of field corresponding to the second image sensor.

In some examples, the simulated aperture size is larger than a first aperture corresponding to the first image sensor and/or than a second aperture corresponding to the second image sensor. Examples of the size of the first aperture and/or the size of the second aperture include the first aperture sizes 615 of the apertures corresponding to the cameras with the image sensors 610, the first aperture sizes 715 of the apertures corresponding to the cameras with the image sensors 710, aperture sizes of the camera(s) that capture image(s) of the image set 1010, aperture sizes of the camera(s) that capture image(s) of the image set 1010, an aperture size of a camera that captures the input image 1205, an aperture size of a camera that captures the input image 1305, an aperture size of a camera that captures the input image 1405, an aperture size of a camera that captures the input image 1505, or a combination thereof. In some examples, the size of the first aperture corresponding to the first image sensor is equal to the size of the second aperture corresponding to the first image sensor. In some examples, the size of the first aperture corresponding to the first image sensor is distinct from (e.g., larger than or smaller than) the size of the second aperture corresponding to the first image sensor.

In some examples, the second image sensor and the first image sensor are the same image sensor at different positions. In an illustrative example, a user may hold and move the imaging device to reposition an image sensor from a first position to a second position. In another illustrative example, the imaging device may actuate a motor to reposition an image sensor from a first position to a second position. In either illustrative example, the image sensor may be referred to as the first image sensor while the image sensor is at the first position, and may be referred to as the second image sensor while the image sensor is at the second position.

In some examples, the imaging system is configured to, and can, receive an input indicating the synthetic depth of field. For instance, the input can identify an object in the scene, or region of the scene. The imaging system can determine the synthetic depth of field so that the object or region appears sharp and/or clear and/or in-focus in the image generated at operation 1615, while one or more other portions outside of the object or region appear blurry and/or out-of-focus in the image generated at operation 1615. The input may be an input to a user interface, such as a touchscreen or cursor-based input relative to a preview image of the scene that is displayed while the input is received. The input may be an input that is generated by an object detection algorithm run by the imaging system, or a remote system that the imaging system is coupled to the imaging system. In some examples, the input can identify, or be indicative of, the simulated aperture size. In some examples, the input can identify, or be indicative of, a step in a shallower or deeper direction relative to a baseline depth of field. The baseline depth of field may be, for example, a depth of field of the first image data and/or the second image data. In some examples, the preview image may include, and/or be based on, the first image data and/or the second image data.

In some examples, the imaging system is configured to, and can, identify that an object is depicted in the first image data. For instance, the imaging system can identify that an object is depicted in the first image data based on the imaging system, or a remote system coupled to the imaging system, detecting the object using an object detection algorithm. The imaging system is configured to, and can, automatically determine the synthetic depth of field so that the object is in-focus in the image based on the synthetic depth of field. The object detection algorithm can include a feature detection algorithm, a feature recognition algorithm, an object detection algorithm, an object recognition algorithm, a facial detection algorithm, a facial recognition algorithm, a person detection algorithm, a person recognition algorithm, an optical character detection algorithm, an optical character recognition (OCR) algorithm, a classifier, an optical glyph detector, an optical glyph scanner, or a combination thereof. The object detection algorithm can be executed by one or more processors of the imaging system. The object detection algorithm can include one or more trained machine learning (ML) systems.

In some examples, the imaging system receives third image data of the scene captured by a third image sensor. To generate the image, the imaging system is configured to, and can, use at least the first image data and the second image data and the third image data as the inputs to the one or more trained machine learning systems. In some examples, the imaging system receives fourth image data of the scene captured by a fourth image sensor. To generate the image, the imaging system is configured to, and can, use at least the first image data and the second image data and the third image data and the fourth image data as the inputs to the one or more trained machine learning systems. Examples of the first image sensor, the second image sensor, the third image sensor, and/or the fourth image sensor include the image sensors 430A-430D, the image sensors of the cameras 530A, the image sensors of the cameras 530B, the image sensors of the cameras 530C, the image sensors 610, the image sensors 710, the image sensors that capture the image set 1010, or a combination thereof. Examples of the first image data, the second image data, the third image data, and/or the fourth image data include image data captured by the image sensors 430A-430D, image data captured by the cameras 530A, image data captured by the cameras 530B, image data captured by the cameras 530C, the image set 605, the image set 705, the image set 1010, or a combination thereof.

In some examples, the image includes a first region and a second region. The first region is in-focus, sharp, and/or clear. The second region is blurred, blurry, unclear, and/or out-of-focus. In some examples, the first region depicts a foreground and the second region depicts a background (e.g., as in output image 630, output image 770, output image 1210). In some examples, the first region depicts a background and the second region depicts a foreground (e.g., as in output image 1310). In some examples, the first region depicts one or more objects as visible through a transparent, translucent, see-through, and/or light-transmissive material (e.g., as in the first output image 1510). In some examples, the first region depicts one or more objects as visible through a reflection (e.g. as in the second output image 1515).

In some examples, the imaging system generates, using at least the first image data and the second image data as inputs to the one or more trained machine learning systems, a disparity error map that identifies one or more disparity error regions corresponding to the image. To generate the image at operation 1615, the imaging system is configured to, and can, generate the image based also on the disparity error map. Examples of the disparity error map include the disparity error maps 805 and/or the disparity error maps 1045. Examples of generation of the disparity error maps using the one or more trained machine learning systems include use of the first trained ML model 760 as illustrated in FIGS. 7 and 8A, use of the trained NN 1005B as illustrated in FIG. 10B, and/or use of the NN 900.

In some examples, the imaging system generates downscaled first image data at least in part by downscaling the first image data, and generates downscaled second image data at least in part by downscaling the second image data. Examples of the downscaled first image data and/or the downscaled second image data include the downscaled variant(s) of the image set 705 downscaled by the downscaler 750, the downscaled variant(s) of the image set 705 downscaled by the downscaler 755, the downscaled variants 1040 of the image set 1010, other downscaled image data described herein, or a combination thereof.

In some examples, the imaging system generates, using at least the downscaled first image data and/or the downscaled second image data as inputs to the one or more trained machine learning systems, a second image having the synthetic depth of field. The second image can be referred to as an intermediate image. Examples of the second image having the synthetic depth of field include the intermediate images 810 having the synthetic depth of field 740, the intermediate images 1050 having the synthetic depth of field 1025, another intermediate image described herein, or a combination thereof. In some examples, the second image is a smaller one of a set of intermediate images, since it is based on the downscaled first image data and the downscaled second image data. For instance, examples of the second image can include one of the smaller intermediate images of the intermediate images 810 (other than the largest intermediate image), one of the smaller intermediate images of the intermediate images 1050 (other than the largest intermediate image), other intermediate images described herein, or a combination thereof. Examples of generation of the second image using the one or more trained ML systems are illustrated at least in FIGS. 8A, 9, and 10B.

In some examples, the imaging system generates, using at least the downscaled first image data and the downscaled second image data as inputs to the one or more trained machine learning systems, a second disparity error map that identifies a second set of one or more disparity error regions corresponding to the second image. For example, the second disparity error map may include one of the smaller disparity error maps of the disparity error maps 805 (other than the largest disparity error map), one of the smaller disparity error maps of the disparity error maps 1045 (other than the largest disparity error map), other disparity error maps described herein, or a combination thereof. Examples of generation of the disparity error maps using the one or more trained machine learning systems include use of the first trained ML model 760 as illustrated in FIGS. 7 and 8A, use of the trained NN 1005B as illustrated in FIG. 10B, and/or use of the NN 900. In some examples, to generate the image, the imaging system is configured to, and can, generate the image to include one or more upscaled portions of the second image at one or more positions associated with a reduction in disparity error in the second disparity error map compared to the disparity error map. For example, portions of the second disparity error map may include reduced disparity error compared to the disparity error map, similarly to how portions of the smaller disparity error maps of the disparity error maps 805 illustrated in FIGS. 8A-8B include reduced disparity error compared to the larger disparity error maps of the disparity error maps 805 illustrated in FIGS. 8A-8B. In these positions associated with reduced disparity error, the imaging system may use upscaled portions of the second image (e.g., of a smaller intermediate image) rather than portions of a third image (e.g., of a larger intermediate image such as the largest intermediate images of the intermediate images 810 and/or of the intermediate images 1050).

At operation 1620, the imaging system is configured to, and can, output the image. In some examples, the imaging system outputs the image by displaying the image on a display. In some examples, the imaging system includes the display. Examples of the display include the output device 1735. In some examples, the imaging system outputs the image by transmitting the image to a recipient device using a communication transceiver. In some examples, the imaging system includes the communication transceiver. The communication transceiver can include a wired communication transceiver, a wireless communication transceiver, a network communication transceiver, or a combination thereof. Examples of the communication transceiver include the communication interface 1740.

In some examples, the one or more trained machine learning systems are trained using training data from a light field camera. In some examples, the imaging system trains the one or more trained machine learning systems using the training data from the light field camera. In some examples, the light field camera includes an array of image sensors. In some examples, the training data includes an output image generated by the light field camera based on image data captured by the array of image sensors. In some examples, the training data includes at least a subset of the image data captured by a third image sensor and a fourth image sensor of the array of image sensors. The third image sensor is offset from the fourth image sensor by the same offset distance that the first image sensor and the second image sensor are offset by, as described with respect to operation 1610. Examples of the training data include the training data 1110, the training data 1120, other training data described herein, or combinations thereof. Examples of the light field camera include the light field camera 1140, other light field cameras described herein, or combinations thereof. The light field camera can be referred to as a plenoptic camera.

In some aspects, the imaging system can include: means for receiving first image data of a scene captured by a first image sensor; means for receiving second image data of the scene captured by a second image sensor, wherein the first image sensor is offset from the second image sensor by an offset distance; means for generating, using at least the first image data and the second image data as inputs to one or more trained machine learning systems, an image having a synthetic depth of field corresponding to a simulated aperture size, wherein the simulated aperture size is associated with the offset distance; and means for outputting the image.

In some examples, the means for receiving the first image data include the image sensor 130, the image capture device 105A, the image processing device 105B, the image capture and processing system 100, the image sensors 430A-430D, a camera that includes the lens 415A and the control mechanisms 420A and the image sensor 430A, a camera that includes the lens 415B and the control mechanisms 420B and the image sensor 430B, a camera that includes the lens 415C and the control mechanisms 420C and the image sensor 430C, a camera that includes the lens 415D and the control mechanisms 420D and the image sensor 430D, the cameras 530A-530C, the camera modules 525A-525C, the image sensors 610, the cameras with the image sensors 610 and the first aperture sizes 615, the image sensors 710, the cameras with the image sensors 710 and the first aperture sizes 715, camera(s) that capture the image set 1010, image sensor(s) that capture the image set 1010, the input device 1745, another camera described herein, or a combination thereof. In some examples, the means for receiving the second image data include the image sensor 130, the image capture device 105A, the image processing device 105B, the image capture and processing system 100, the image sensors 430A-430D, a camera that includes the lens 415A and the control mechanisms 420A and the image sensor 430A, a camera that includes the lens 415B and the control mechanisms 420B and the image sensor 430B, a camera that includes the lens 415C and the control mechanisms 420C and the image sensor 430C, a camera that includes the lens 415D and the control mechanisms 420D and the image sensor 430D, the cameras 530A-530C, the camera modules 525A-525C, the image sensors 610, the cameras with the image sensors 610 and the first aperture sizes 615, the image sensors 710, the cameras with the image sensors 710 and the first aperture sizes 715, camera(s) that capture the image set 1010, image sensor(s) that capture the image set 1010, the input device 1745, another camera described herein, or a combination thereof.

In some examples, the means for generating the image include the ISP 154, the host processor 152, the image processor 150, the image processor(s) 450, the image processing device 405B, the image capture and processing system 400, a processor of one of the mobile handsets 510A-510C, the trained ML model 625, the first trained ML model 760, the second trained ML model 765, the NN 900, the trained NN 1005A, the trained NN 1005B, the trained NN 1005C, the processor 1710, or a combination thereof. In some examples, the means for outputting the image includes a display, a communication transceiver, an output device coupled to the I/O 156, an output device coupled to the I/O 160, an output device 1735, a communication interface 1740, or a combination thereof.

In some examples, the processes described herein (e.g., the process of FIGS. 2A-2B, the process of FIG. 3, the process of FIG. 6, the process of FIG. 7, the process of FIG. 8A, the process of FIG. 8B, the process performed using the trained NN 1005A of FIG. 10A, the process performed using the trained NN 1005B of FIG. 10B, the process performed using the trained NN 1005C of FIG. 10C, the training process of FIGS. 11A-11B, the process of FIG. 12, the process of FIG. 13, the process of FIG. 14, the process of FIG. 15, the process 1600 of FIG. 16, and/or other process described herein) may be performed by a computing device or apparatus. In some examples, the processes described herein and listed above herein can be performed by the image capture and processing system 400, one of the mobile handsets 510A-510C, or a combination thereof. In another example, the processes described herein can be performed by a computing device with the computing system 1700 shown in FIG. 17.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes described herein and listed above. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein and listed above are illustrated as logical flow diagrams, block diagrams, and/or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process described herein and listed above may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
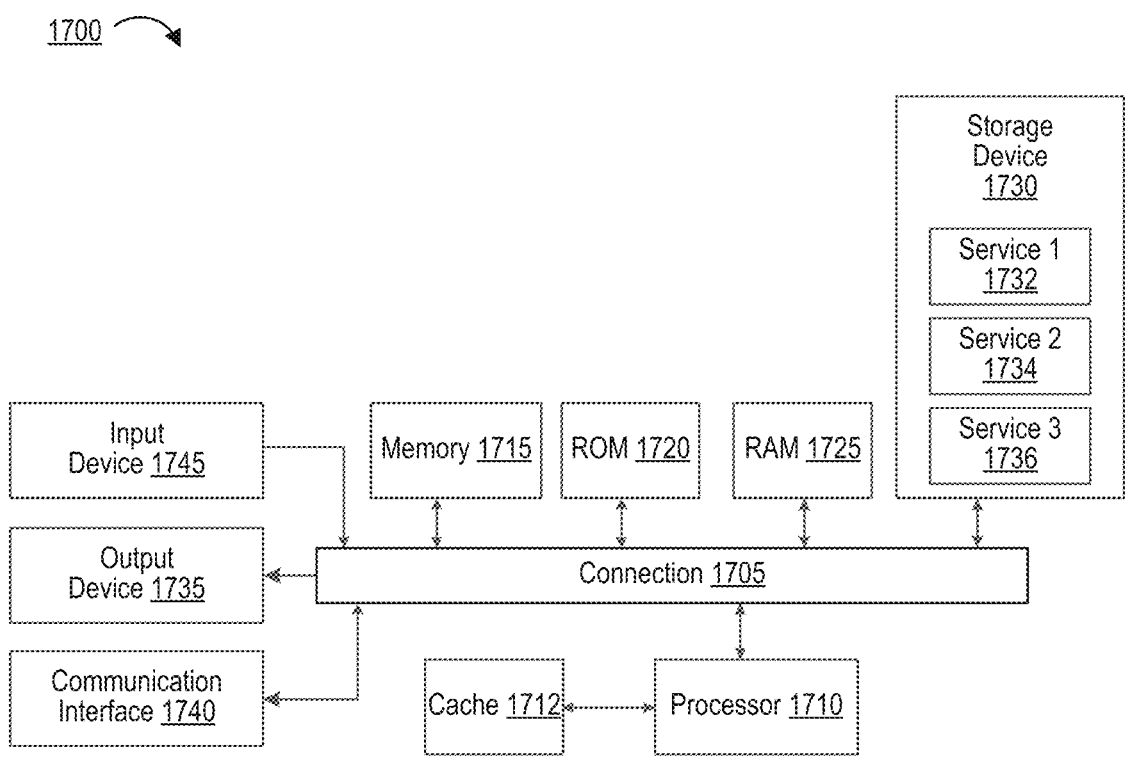
FIG. 17 is a diagram illustrating an example of a computing system for implementing certain aspects described herein.

FIG. 17 is a diagram illustrating an example of a system for implementing certain aspects of the present technology. In particular, FIG. 17 illustrates an example of computing system 1700, which can be for example any computing device making up internal computing system, a remote computing system, a camera, or any component thereof in which the components of the system are in communication with each other using connection 1705. Connection 1705 can be a physical connection using a bus, or a direct connection into processor 1710, such as in a chipset architecture. Connection 1705 can also be a virtual connection, networked connection, or logical connection.

In some embodiments, computing system 1700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1700 includes at least one processing unit (CPU or processor) 1710 and connection 1705 that couples various system components including system memory 1715, such as read-only memory (ROM) 1720 and random access memory (RAM) 1725 to processor 1710. Computing system 1700 can include a cache 1712 of high-speed memory connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms. In some instances, multimodal systems can enable a user to provide multiple types of input/output to communicate with computing system 1700. Computing system 1700 can include communication interface 1740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 1740 may also include one or more Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1730 can include software services, servers, services, etc., that when the code that defines such software is executed by the processor 1710, it causes the system to perform a function. In some embodiments, a hardware service that performs a particular function can include the software component stored in a computer-readable medium in connection with the necessary hardware components, such as processor 1710, connection 1705, output device 1735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing image data, the apparatus comprising: a memory; and one or more processors coupled to the memory, the one or more processors configured to: receive first image data of a scene captured by a first image sensor; receive second image data of the scene captured by a second image sensor, wherein the first image sensor is offset from the second image sensor by an offset distance; generate, using at least the first image data and the second image data as inputs to one or more trained machine learning systems, an image having a synthetic depth of field corresponding to a simulated aperture size, wherein the simulated aperture size is associated with the offset distance; and output the image.

Aspect 2. The apparatus of Aspect 1, wherein the one or more processors are configured to generate, using at least the first image data and the second image data as inputs to the one or more trained machine learning systems, a disparity error map that identifies one or more disparity error regions corresponding to the image, wherein, to generate the image, the one or more processors are configured to generate the image based also on the disparity error map.

Aspect 3. The apparatus of any of Aspects 1 to 2, wherein the one or more processors are configured to: generate downscaled first image data at least in part by downscaling the first image data; generate downscaled second image data at least in part by downscaling the second image data; generate, using at least the downscaled first image data and the downscaled second image data as inputs to the one or more trained machine learning systems, a second image having the synthetic depth of field; and generate, using at least the downscaled first image data and the downscaled second image data as inputs to the one or more trained machine learning systems, a second disparity error map that identifies a second set of one or more disparity error regions corresponding to the second image, wherein, to generate the image, the one or more processors are configured to generate the image to include one or more upscaled portions of the second image at one or more positions associated with a reduction in disparity error in the second disparity error map compared to the disparity error map.

Aspect 4. The apparatus of any of Aspects 1 to 3, wherein the simulated aperture size is based on the offset distance.

Aspect 5. The apparatus of any of Aspects 1 to 4, wherein the simulated aperture size is equal to the offset distance.

Aspect 6. The apparatus of any of Aspects 1 to 5, wherein the simulated aperture size is a function of the offset distance.

Aspect 7. The apparatus of any of Aspects 1 to 6, wherein the simulated aperture size is a diameter of a simulated aperture corresponding to the synthetic depth of field.

Aspect 8. The apparatus of any of Aspects 1 to 7, wherein the simulated aperture size is an area of a simulated aperture corresponding to the synthetic depth of field.

Aspect 9. The apparatus of any of Aspects 1 to 8, wherein the first image sensor being offset from the second image sensor by the offset distance includes a first optical axis associated with the first image sensor being offset from a second optical axis associated with the second image sensor by the offset distance.

Aspect 10. The apparatus of any of Aspects 1 to 9, wherein the synthetic depth of field is shallower than at least one of a first depth of field corresponding to the first image sensor and a second depth of field corresponding to the second image sensor.

Aspect 11. The apparatus of any of Aspects 1 to 10, the simulated aperture size is larger than a first aperture corresponding to the first image sensor and a second aperture corresponding to the second image sensor.

Aspect 12. The apparatus of any of Aspects 1 to 11, wherein the one or more processors are configured to: receive third image data of the scene captured by a third image sensor, wherein, to generate the image, the one or more processors are configured to use at least the first image data and the second image data and the third image data as the inputs to the one or more trained machine learning systems.

Aspect 13. The apparatus of any of Aspects 1 to 12, wherein the one or more processors are configured to: receive fourth image data of the scene captured by a fourth image sensor, wherein, to generate the image, the one or more processors are configured to use at least the first image data and the second image data and the third image data and the fourth image data as the inputs to the one or more trained machine learning systems.

Aspect 14. The apparatus of any of Aspects 1 to 13, wherein the one or more processors are configured to: receive an input indicating the synthetic depth of field.

Aspect 15. The apparatus of any of Aspects 1 to 14, wherein the one or more processors are configured to: identify that an object is depicted in the first image data; and automatically determine the synthetic depth of field, wherein the object is in-focus in the image based on the synthetic depth of field.

Aspect 16. The apparatus of any of Aspects 1 to 15, wherein the one or more trained machine learning systems are trained using training data from a light field camera.

Aspect 17. The apparatus of any of Aspects 1 to 16, wherein the light field camera includes an array of image sensors, wherein the training data includes an output image generated by the light field camera based on image data captured by the array of image sensors, wherein the training data includes at least a subset of the image data captured by a third image sensor and a fourth image sensor of the array of image sensors, wherein the third image sensor is offset from the fourth image sensor by an offset distance, wherein the first image sensor is offset from the second image sensor by the offset distance.

Aspect 18. The apparatus of any of Aspects 1 to 17, wherein the image includes a first region that is in-focus and a second region that is blurred.

Aspect 19. The apparatus of any of Aspects 1 to 18, wherein the first region depicts a foreground, wherein the second region depicts a background.

Aspect 20. The apparatus of any of Aspects 1 to 19, wherein the first region depicts a background, wherein the second region depicts a foreground.

Aspect 21. The apparatus of any of Aspects 1 to 20, further comprising: a display, wherein, to output the image, the one or more processors are configured to display the image using the display.

Aspect 22. The apparatus of any of Aspects 1 to 21, further comprising: a communication transceiver, wherein, to output the image, the one or more processors are configured to send the image to a recipient device using the communication transceiver.

Aspect 23. The apparatus of any of Aspects 1 to 22, further comprising: the first image sensor; and the second image sensor.

Aspect 24. The apparatus of any of Aspects 1 to 23, wherein the apparatus includes at least one of a mobile handset, a wireless communication device, and a head-mounted display.

Aspect 25. A method for processing image data, the method comprising: receiving first image data of a scene captured by a first image sensor; receiving second image data of the scene captured by a second image sensor, wherein the first image sensor is offset from the second image sensor by an offset distance; generating, using at least the first image data and the second image data as inputs to one or more trained machine learning systems, an image having a synthetic depth of field corresponding to a simulated aperture size, wherein the simulated aperture size is associated with the offset distance; and outputting the image.

Aspect 26. The method of Aspect 25, further comprising: generating, using at least the first image data and the second image data as inputs to the one or more trained machine learning systems, a disparity error map that identifies one or more disparity error regions corresponding to the image, wherein generating the image includes generating the image based also on the disparity error map.

Aspect 27. The method of any of Aspects 25 to 26, further comprising: generating downscaled first image data at least in part by downscaling the first image data; generating downscaled second image data at least in part by downscaling the second image data; generating, using at least the downscaled first image data and the downscaled second image data as inputs to the one or more trained machine learning systems, a second image having the synthetic depth of field; and generating, using at least the downscaled first image data and the downscaled second image data as inputs to the one or more trained machine learning systems, a second disparity error map that identifies a second set of one or more disparity error regions corresponding to the second image, wherein generating the image includes generating the image to include one or more upscaled portions of the second image at one or more positions associated with a reduction in disparity error in the second disparity error map compared to the disparity error map.

Aspect 28. The method of any of Aspects 25 to 27, wherein the simulated aperture size is based on the offset distance.

Aspect 29. The method of any of Aspects 25 to 28, wherein the simulated aperture size is equal to the offset distance.

Aspect 30. The method of any of Aspects 25 to 29, wherein the simulated aperture size is a function of the offset distance.

Aspect 31. The method of any of Aspects 25 to 30, wherein the simulated aperture size is a diameter of a simulated aperture corresponding to the synthetic depth of field.

Aspect 32. The method of any of Aspects 25 to 31, wherein the simulated aperture size is an area of a simulated aperture corresponding to the synthetic depth of field.

Aspect 33. The method of any of Aspects 25 to 32, wherein the first image sensor being offset from the second image sensor by the offset distance includes a first optical axis associated with the first image sensor being offset from a second optical axis associated with the second image sensor by the offset distance.

Aspect 34. The method of any of Aspects 25 to 33, wherein the synthetic depth of field is shallower than at least one of a first depth of field corresponding to the first image sensor and a second depth of field corresponding to the second image sensor.

Aspect 35. The method of any of Aspects 25 to 34, the simulated aperture size is larger than a first aperture corresponding to the first image sensor and a second aperture corresponding to the second image sensor.

Aspect 36. The method of any of Aspects 25 to 35, further comprising: receiving third image data of the scene captured by a third image sensor, wherein generating the image includes using at least the first image data and the second image data and the third image data as the inputs to the one or more trained machine learning systems.

Aspect 37. The method of any of Aspects 25 to 36, further comprising: receiving fourth image data of the scene captured by a fourth image sensor, wherein, generating the image includes using at least the first image data and the second image data and the third image data and the fourth image data as the inputs to the one or more trained machine learning systems.

Aspect 38. The method of any of Aspects 25 to 37, further comprising: receiving an input indicating the synthetic depth of field.

Aspect 39. The method of any of Aspects 25 to 38, further comprising: identify that an object is depicted in the first image data; and automatically determine the synthetic depth of field, wherein the object is in-focus in the image based on the synthetic depth of field.

Aspect 40. The method of any of Aspects 25 to 39, further comprising: training the one or more trained machine learning systems are trained using training data from a light field camera.

Aspect 41. The method of any of Aspects 25 to 40, wherein the light field camera includes an array of image sensors, wherein the training data includes an output image generated by the light field camera based on image data captured by the array of image sensors, wherein the training data includes at least a subset of the image data captured by a third image sensor and a fourth image sensor of the array of image sensors, wherein the third image sensor is offset from the fourth image sensor by the offset distance.

Aspect 42. The method of any of Aspects 25 to 41, wherein the image includes a first region that is in-focus and a second region that is blurred.

Aspect 43. The method of any of Aspects 25 to 42, wherein the first region depicts a foreground, wherein the second region depicts a background.

Aspect 44. The method of any of Aspects 25 to 43, wherein the first region depicts a background, wherein the second region depicts a foreground.

Aspect 45. The method of any of Aspects 25 to 44, wherein outputting the image includes displaying the image using a display.

Aspect 46. The method of any of Aspects 25 to 45 wherein outputting the image includes sending the image to a recipient device using a communication transceiver.

Aspect 47. The method of any of Aspects 25 to 46, wherein the method is performed by an apparatus that includes the first image sensor and the second image sensor.

Aspect 48. The method of any of Aspects 25 to 47, wherein the method is performed by at least one of a mobile handset, a wireless communication device, and a head-mounted display.

Aspect 49. A non-transitory computer-readable medium having stored thereon instructions that, when executed by one or more processors, cause the one or more processors to: receive first image data of a scene captured by a first image sensor; receive second image data of the scene captured by a second image sensor, wherein the first image sensor is offset from the second image sensor by an offset distance; generate, using at least the first image data and the second image data as inputs to one or more trained machine learning systems, an image having a synthetic depth of field corresponding to a simulated aperture size, wherein the simulated aperture size is associated with the offset distance; and output the image.

Aspect 50. The non-transitory computer-readable medium of Aspect 49, further comprising any of Aspects 2 to 24, and/or any of Aspects 26 to 48.

Aspect 51. An apparatus for image processing, the apparatus comprising: means for receiving first image data of a scene captured by a first image sensor; receiving second image data of the scene captured by a second image sensor, wherein the first image sensor is offset from the second image sensor by an offset distance; generating, using at least the first image data and the second image data as inputs to one or more trained machine learning systems, an image having a synthetic depth of field corresponding to a simulated aperture size, wherein the simulated aperture size is associated with the offset distance; and outputting the image.

Aspect 52. The apparatus of Aspect 51, further comprising any of Aspects 2 to 24, and/or any of Aspects 26 to 48.

What is claimed is:

1. An apparatus for processing image data, the apparatus comprising:
    at least one memory; and
    at least one processor coupled to the at least one memory, the at least one processor configured to:
        receive first image data of a physical environment captured by a first image sensor through a first aperture, wherein the first image data has a first depth of field;
        receive second image data of the physical environment captured by a second image sensor through a second aperture, wherein the second image data has a second depth of field, wherein the first image sensor is offset from the second image sensor by an offset distance;
        generate, using at least the first image data and the second image data as inputs to at least one trained machine learning model, an image of the physical environment having a synthetic depth of field corresponding to a simulated aperture size without using a physical aperture having the simulated aperture size, wherein the synthetic depth of field is shallower than the first depth of field and the second depth of field, wherein the simulated aperture size is larger than the first aperture and the second aperture, and wherein the simulated aperture size is at least as large as the offset distance; and
        output the image.

2. The apparatus of claim 1, the at least one processor configured to:
generate, using at least the first image data and the second image data as inputs to the at least one trained machine learning model, a disparity error map that identifies one or more disparity error regions corresponding to the image; and
generate the image based also on the disparity error map to generate the image.

3. The apparatus of claim 2, the at least one processor configured to:
generate downscaled first image data at least in part by downscaling the first image data;
generate downscaled second image data at least in part by downscaling the second image data;
generate, using at least the downscaled first image data and the downscaled second image data as inputs to the at least one trained machine learning model, a second image having the synthetic depth of field;
generate, using at least the downscaled first image data and the downscaled second image data as inputs to the at least one trained machine learning model, a second disparity error map that identifies a second set of one or more disparity error regions corresponding to the second image; and
generate the image to include one or more upscaled portions of the second image at one or more positions associated with a reduction in disparity error in the second disparity error map compared to the disparity error map to generate the image.

4. The apparatus of claim 1, wherein the simulated aperture size is based on the offset distance.

5. The apparatus of claim 1, wherein the simulated aperture size is a diameter of a simulated aperture corresponding to the synthetic depth of field.

6. The apparatus of claim 1, wherein the simulated aperture size is an area of a simulated aperture corresponding to the synthetic depth of field.

7. The apparatus of claim 1, wherein the first image sensor being offset from the second image sensor by the offset distance includes a first optical axis associated with the first image sensor being offset from a second optical axis associated with the second image sensor by the offset distance.

8. The apparatus of claim 1, the at least one processor configured to:
receive third image data of the physical environment captured by a third image sensor; and
use at least the first image data and the second image data and the third image data as the inputs to the at least one trained machine learning model to generate the image.

9. The apparatus of claim 8, the at least one processor configured to:
receive fourth image data of the physical environment captured by a fourth image sensor; and
use at least the first image data and the second image data and the third image data and the fourth image data as the inputs to the at least one trained machine learning model to generate the image.

10. The apparatus of claim 1, the at least one processor configured to:
receive an input indicative of the synthetic depth of field.

11. The apparatus of claim 1, the at least one processor configured to:
identify that an object is depicted in the first image data; and
automatically determine the synthetic depth of field, wherein the object is in-focus in the image based on the synthetic depth of field.

12. The apparatus of claim 1, wherein the image includes a first region that is in-focus and a second region that is blurred.

13. The apparatus of claim 12, wherein the first region depicts a foreground, wherein the second region depicts a background.

14. The apparatus of claim 1, further comprising:
a display configured to display the image to output the image.

15. The apparatus of claim 1, further comprising:
a communication transceiver configured to send the image to a recipient device to output the image.

16. The apparatus of claim 1, further comprising:
the first image sensor; and
the second image sensor.

17. The apparatus of claim 1, wherein the apparatus includes at least one of a mobile handset, a wireless communication device, and a head-mounted display.

18. A method for processing image data, the method comprising:
receiving first image data of a physical environment captured by a first image sensor through a first aperture, wherein the first image data has a first depth of field;
receiving second image data of the physical environment captured by a second image sensor through a second aperture, wherein the second image data has a second depth of field, wherein the first image sensor is offset from the second image sensor by an offset distance;
generating, using at least the first image data and the second image data as inputs to at least one trained machine learning model, an image of the physical environment having a synthetic depth of field corresponding to a simulated aperture size without using a physical aperture having the simulated aperture size, wherein the synthetic depth of field is shallower than the first depth of field and the second depth of field, wherein the simulated aperture size is larger than the first aperture and the second aperture, and wherein the simulated aperture size is at least as large as the offset distance; and
outputting the image.

19. The method of claim 18, further comprising:
generating, using at least the first image data and the second image data as inputs to the at least one trained machine learning model, a disparity error map that identifies one or more disparity error regions corresponding to the image, wherein generating the image includes generating the image based also on the disparity error map.

20. The method of claim 19, further comprising:
generating downscaled first image data at least in part by downscaling the first image data;
generating downscaled second image data at least in part by downscaling the second image data;
generating, using at least the downscaled first image data and the downscaled second image data as inputs to the at least one trained machine learning model, a second image having the synthetic depth of field; and
generating, using at least the downscaled first image data and the downscaled second image data as inputs to the at least one or more trained machine learning model, a second disparity error map that identifies a second set of one or more disparity error regions corresponding to the second image, wherein generating the image includes generating the image to include one or more upscaled portions of the second image at one or more positions associated with a reduction in disparity error in the second disparity error map compared to the disparity error map.

21. The method of claim 18, wherein the simulated aperture size is based on the offset distance.

22. The method of claim 18, wherein the first image sensor being offset from the second image sensor by the offset distance includes a first optical axis associated with the first image sensor being offset from a second optical axis associated with the second image sensor by the offset distance.

23. The method of claim 18, further comprising:
receiving third image data of the physical environment captured by a third image sensor, wherein generating the image includes using at least the first image data and the second image data and the third image data as the inputs to the at least one trained machine learning model.

24. The method of claim 18, further comprising:
receiving an input indicating the synthetic depth of field.

25. The method of claim 18, further comprising:
identify that an object is depicted in the first image data; and
automatically determine the synthetic depth of field, wherein the object is in-focus in the image based on the synthetic depth of field.

26. The method of claim 18, wherein the image includes a first region that is in-focus and a second region that is blurred.

* * * * *